United States Patent [19]

Todd

[11] Patent Number: 5,890,163
[45] Date of Patent: Mar. 30, 1999

[54] SHARING AN ELECTRONIC MAIL MESSAGE WITH A PARTY NOT NAMED AS A RECIPIENT OF THE MESSAGE

[76] Inventor: William Gregory Todd, 10 Archbriar Pl., The Woodlands, Tex. 77382

[21] Appl. No.: 721,556

[22] Filed: Sep. 26, 1996

[51] Int. Cl.$^6$ ..................................................... G60F 17/30
[52] U.S. Cl. ........................................... 707/200; 707/204
[58] Field of Search ................................ 395/616, 200.3, 395/93.01

[56] References Cited

U.S. PATENT DOCUMENTS

| | | | |
|---|---|---|---|
| 5,128,665 | 7/1992 | DeLuca et al. | 340/825.47 |
| 5,195,086 | 3/1993 | Baumgartner et al. | 370/264 |
| 5,283,887 | 2/1994 | Zachary | 395/500 |
| 5,406,557 | 4/1995 | Baudoin | 370/407 |
| 5,446,880 | 8/1995 | Balgeman et al. | 707/9 |
| 5,450,071 | 9/1995 | DeLuca et al. | 340/825.44 |
| 5,613,108 | 3/1997 | Morikawa | 395/616 |
| 5,632,018 | 5/1997 | Otorii | 395/200.04 |

OTHER PUBLICATIONS

Using Collaborative Filtering to Weave an Information Tapestry by David Goldberg et al, pp. 1–10 (Association of Computing Machinery) Feb. 1992.

10 Minutes Gudie to Microsoft Exchange 5.0 by Scott Warner, Que–Macmillain Computer Publishing; 201 West 103rd, Indianapolis, Indiana, 46290, pp. 146–149, and pp. 150–161, Jan. 1997.

Internet Chameleon for Windows by NetManage, Inc. by PC Magazine; pp. 131–137, Apr. 25, 1995.

Krill, Paul "Enterprise Grease, Inter–Application Glue," *Open Systems Today*, Nov. 14, 1994, p. 32.

Gaffin, Adam, "Moving to Client/Server Messaging," *Networking World*, Apr. 10, 1995, vol. 12, No. 15, p. 38.

*Primary Examiner*—Thomas G. Black
*Assistant Examiner*—Diane Mizrahi

[57] ABSTRACT

An electronic mail archiver for use in a computer system includes a user interface that allows a user to identify an electronic mail message to be archived from an electronic mail system, and a message transfer component that automatically retrieves the message from the electronic mail system in an electronic mail format and stores the message in a format defined by a data processing application capable of running in the computer system.

57 Claims, 23 Drawing Sheets

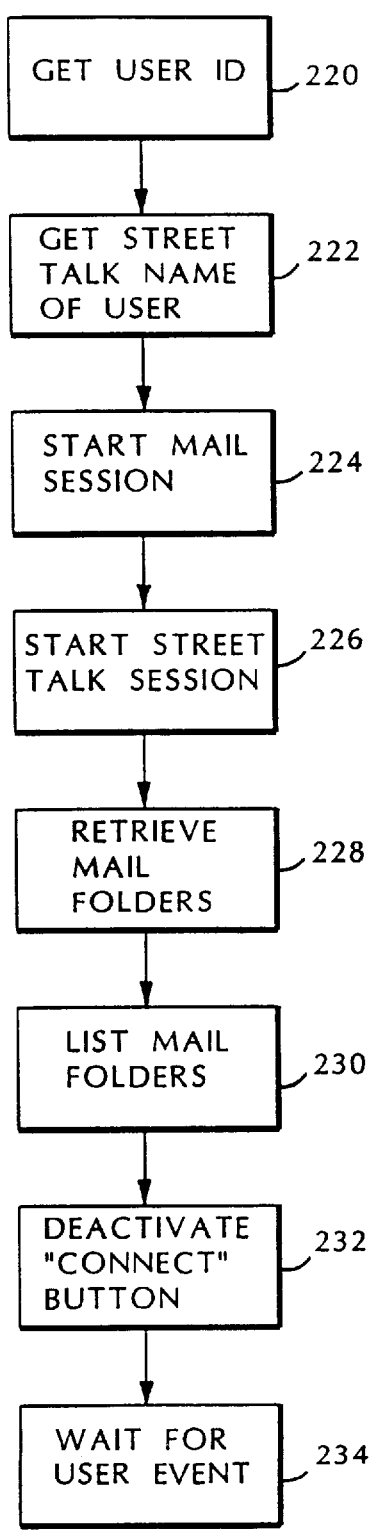
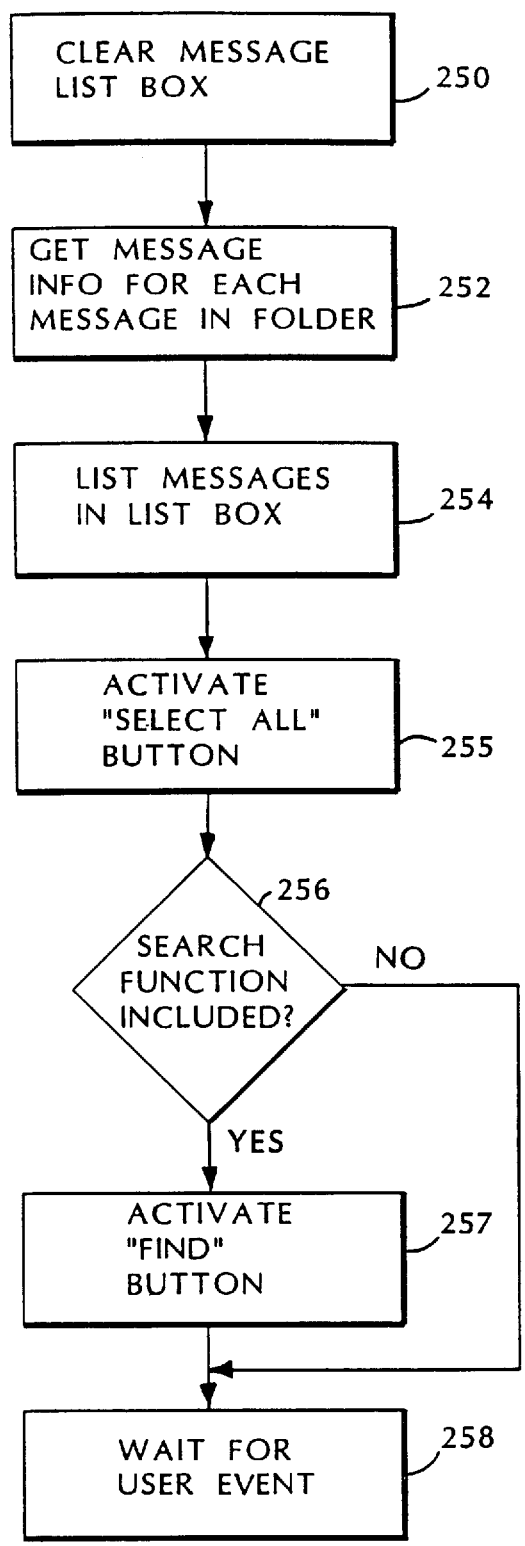
FIG. 7
FIG. 9

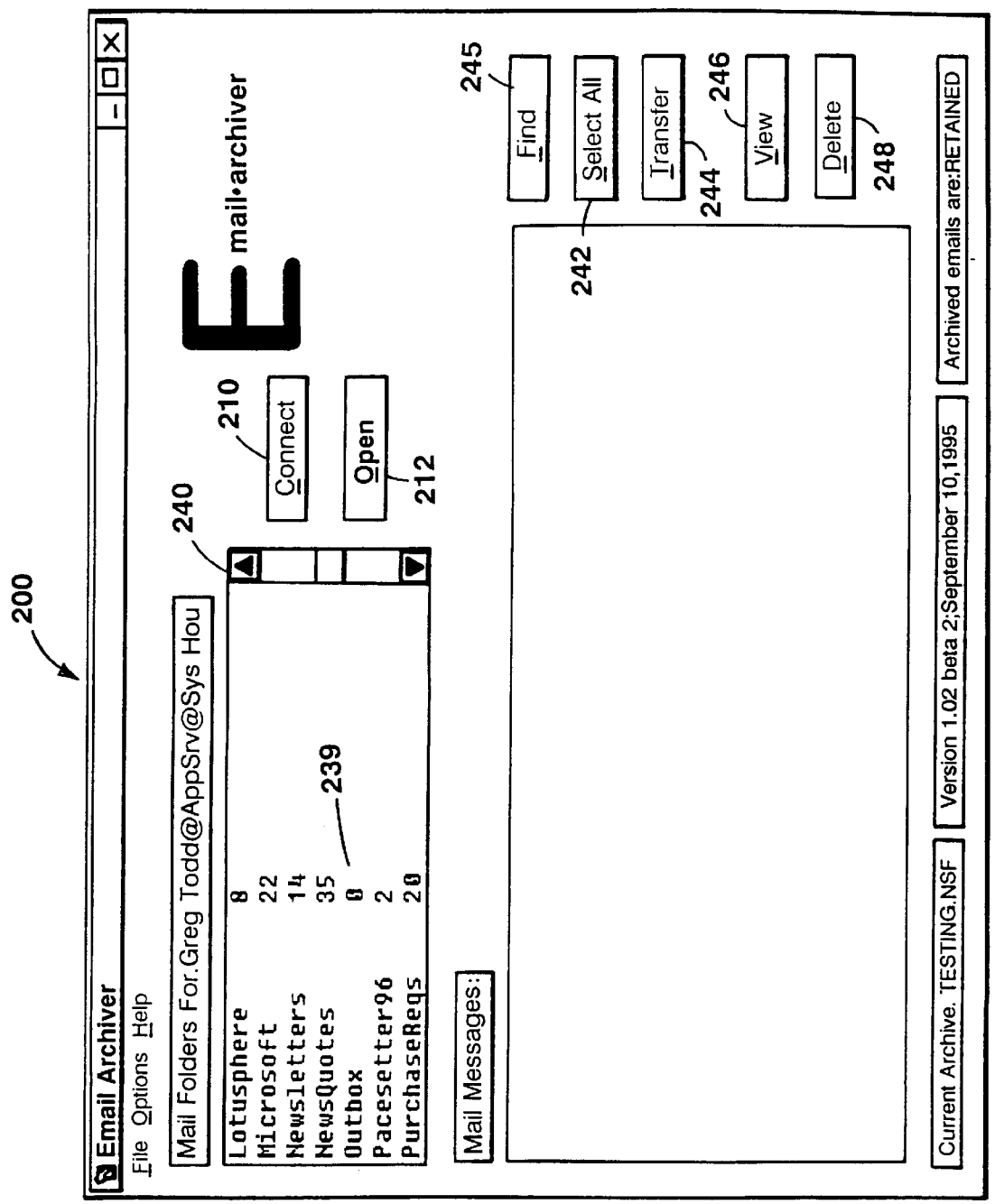

SHARING AN ELECTRONIC MAIL MESSAGE WITH A PARTY NOT NAMED AS A RECIPIENT OF THE MESSAGE

BACKGROUND

The invention relates to archiving messages.

Referring to FIG. 1, in a typical computer network a client computer 20 utilizes services provided by network servers, such as an electronic mail server 22 and a shared information (e.g., data processing) server 24. A single computer or multiple computers may serve as the electronic mail server 22 and the data processing server 24. If the servers 22 and 24 comprise different computer systems, each system includes at least one central processor 21, 23.

Within the client computer 20 are a central processor 25 and client software packages 26, 28 that allow the client computer to communicate with the network servers 22, 24. Each server 22, 24 is equipped with a corresponding network storage device 30, 32, such as a hard drive, that allows the server to store information needed to provide its services to the client computer 20. The client computer 20 also is equipped with a storage device 34 that stores information needed by the computer 20 to perform its assigned tasks. The client computer 20 also includes a display 36 that the electronic mail and data processing packages 26 and 28 use to provide information to a user.

The electronic mail server 22 allows the client computer 20 and other clients to send and receive electronic mail messages among themselves. Within the corresponding storage device 30, the electronic mail server 22 maintains a mail storage area 38 (i.e., a mailbox) for each client computer connected to the server 22. The mailbox 38 stores electronic mail messages 40 generated and received by the client computer 20. With most electronic mail systems, copies of messages 40 held in the mailbox 38 may be stored on the local storage device 34 and later viewed on the display 36 through the electronic mail client package 26.

The data processing server 24 allows the client computer 20 and other clients to share data stored in the corresponding storage device 32. The data processing client package 28 in the client computer 20 passes data to and from the server 24 and displays the data to the user via the display 36. Data stored on the network storage device 32 also may be stored on the client computer's local storage device 34 for later use by the data processing client 28. The data processing server 24 also may have a search engine or search function 29 that allows a user to find certain information quickly.

SUMMARY

In one aspect, the invention features a method for sharing an electronic mail message with a party not named as a recipient of the message. A user is allowed to identify the electronic mail message to be shared. Thereafter, without intervention by the user, the message is automatically converted from an electronic mail format to a shared information format defined by a shared information application, the converted message is automatically stored in a shared information system capable of running the shared information application, and the stored message is automatically made accessible to the party not named as a recipient of the message.

Embodiments of the invention may include one or more of the following features. The user may identify the electronic mail message by providing a user-indicated characteristic of the message. A search function may be used to select the electronic mail message from a group of messages based on the user-indicated characteristic. A search function also may be used to select from a group of messages an additional message to be shared based on the user-indicated characteristic. The shared information application may be a shared database program, such as Lotus Notes.

In another aspect, the invention features a method for automatically archiving an electronic mail message transmitted in an electronic mail format. A user is allowed to identify the electronic mail message to be archived and thereafter, without intervention by the user, the electronic mail message is automatically converted from the electronic mail format into a format defined by a data processing application, and the converted message is automatically archived in a storage device accessible by a data processing system capable of running the data processing application.

Embodiments of the invention may include one or more of the following features. A user may be allowed to provide an instruction to archive all messages. An instruction from a user governing the manner of archiving the message may be automatically applied. This instruction may identify a component of the message to be excluded when the message is archived, it may indicate whether the message is to be deleted from an electronic mail system when the message is archived, and it may identify a location to archive the message in the storage device. The storage device may be connected to a network client computer, and it may be connected to a network server computer. The data processing application may be a database application, such as Lotus Notes.

In another aspect, the invention features a method for storing an electronic mail message received in an electronic mail format. A user is allowed to provide an instruction governing the manner of storing the message and thereafter, based on the user's instruction, the message is converted automatically from the electronic mail format into a format defined by a data processing application, and the converted message is automatically stored in a storage device accessible by a data processing system capable of running the data processing application.

In another aspect, the invention features a method of increasing available storage space in an electronic mail system in a computer network. A network user that is an intended recipient of an electronic mail message stored in the electronic mail system is identified, the electronic mail message is automatically converted from an electronic mail format into a format defined by a data processing application, and the converted message is automatically stored in a storage device attached to a network client computer associated with the user.

In another aspect, the invention features an electronic mail archiver for use in a computer system. The archiver includes a user interface that allows a user to identify an electronic mail message to be archived from an electronic mail system, and a message transfer component that automatically retrieves the message from the electronic mail system in an electronic mail format and stores the message in a format defined by a data processing application capable of running in the computer system.

Embodiments of the invention may include one or more of the following features. The user interface may include a component that allows the user to identify a characteristic of the electronic mail message to be archived. The user interface also may include a search component that selects the message from a group of messages based upon the characteristic identified by the user. The user interface may include a component that allows the user to provide an instruction to archive all electronic mail messages transmitted to the user. The user interface may include a component that allows the user to provide information governing the manner of archiving the electronic mail message. This information may be stored for use in archiving subsequent messages. The data processing application may be a database application, such as Lotus Notes.

In another aspect, the invention features a computer network in which an electronic mail message may be shared with a party not named as a recipient of the message. The computer network includes a user interface that allows a user to identify the electronic mail message to be shared, a formatting component that converts the message from an electronic mail format to a format defined by a data processing application, and a data processing system that retrieves the converted message and makes the converted message available to the party not named.

In another aspect, the invention features a computer system that enables archiving of a message from an electronic mail system. The computer system includes a central processor, a storage device, and an archiving program. The archiving program includes a user interface that allows a user to select the message to be archived, and a component that allows the central processor to receive the message from the electronic mail system in an original electronic mail format, convert the message into a format defined by a data processing application capable of running on the computer system, and store the converted message in the data storage device.

In another aspect, the invention features an electronic mail archiving program fixed on a storage medium. The program includes a component that allows a computer system to receive an electronic mail message from an electronic mail system in an original electronic mail format, a conversion component that causes the computer system to convert the message into a format defined by a data processing application, and a storage component that causes the computer to store the one or more converted messages in a storage device in the computer system.

Advantages of the invention may include one or more of the following. The user of an electronic mail client may store messages locally or on other network servers in a format that allows the user to view and manipulate messages quickly and easily, e.g., with a data processor. For example, the user may use a data processor to organize and search messages quickly. The user also may store messages in a format, such as a Lotus Notes database, that facilitates distribution of the messages to users who were not recipients of the message. Archiving also gives the user more storage capacity to retain messages.

Other features and advantages of the invention will become apparent from the following description and from the claims.

DESCRIPTION

FIGS. 3, 4, and 5A through 5D are flow diagrams of the archiving program.

Figure 6:
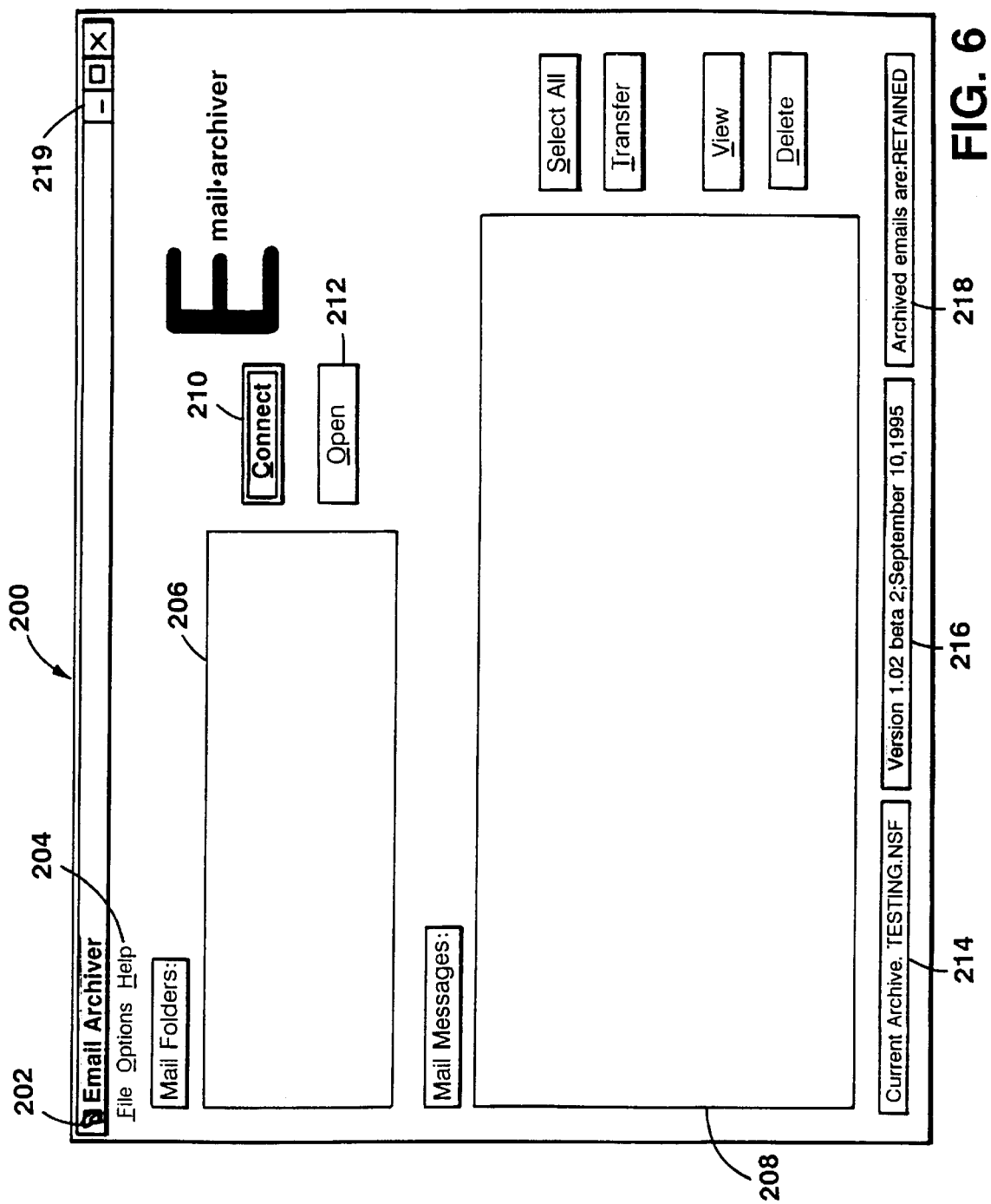

FIG. 6 is the main form displayed on the graphical user interface seen by the user.

FIG. 7 is a flow chart of the archiving program.

FIG. 8 is a form displayed by the graphical user interface.

FIG. 9 is a flow diagram of the archiving program.

Figure 10:
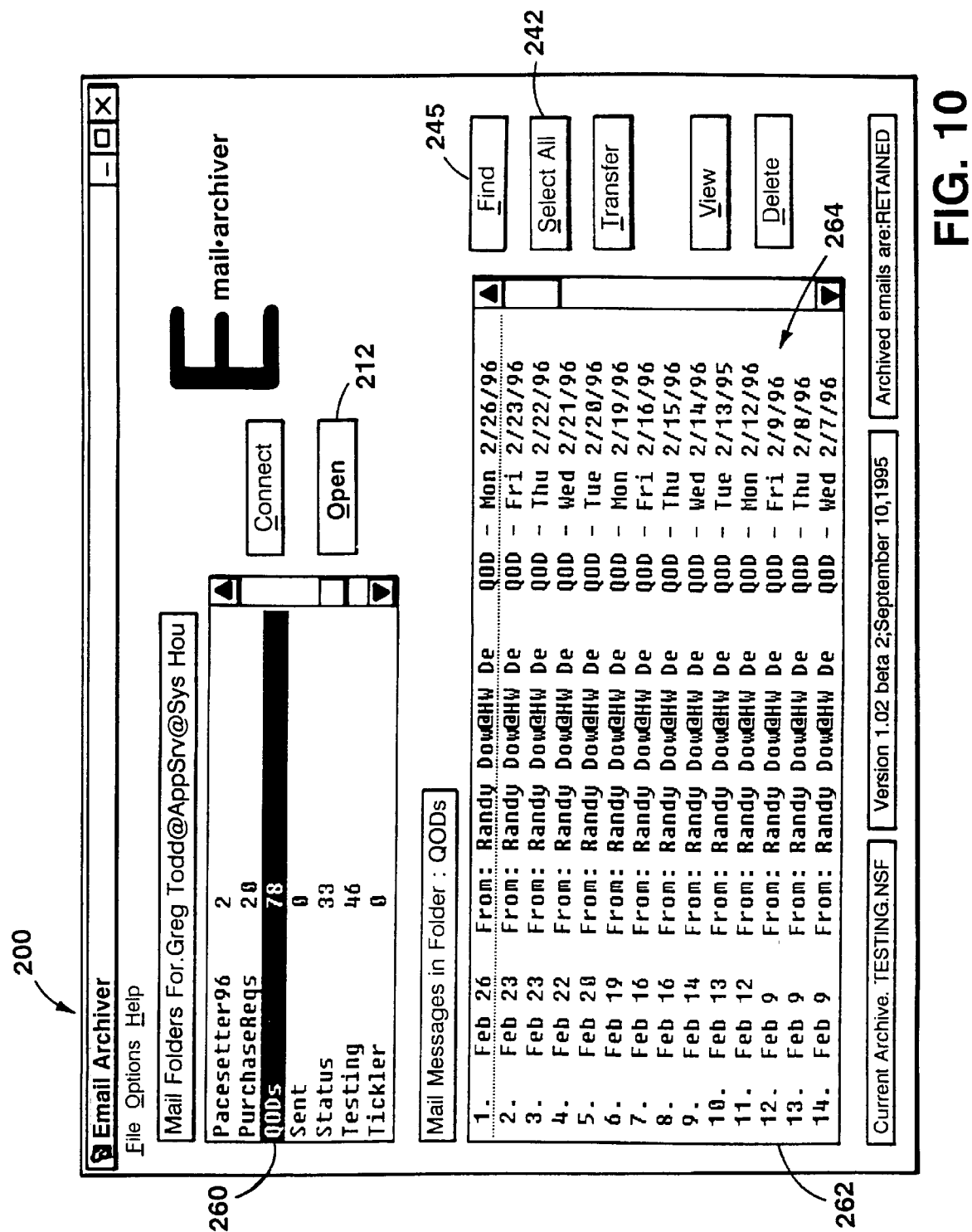
Figure 11:
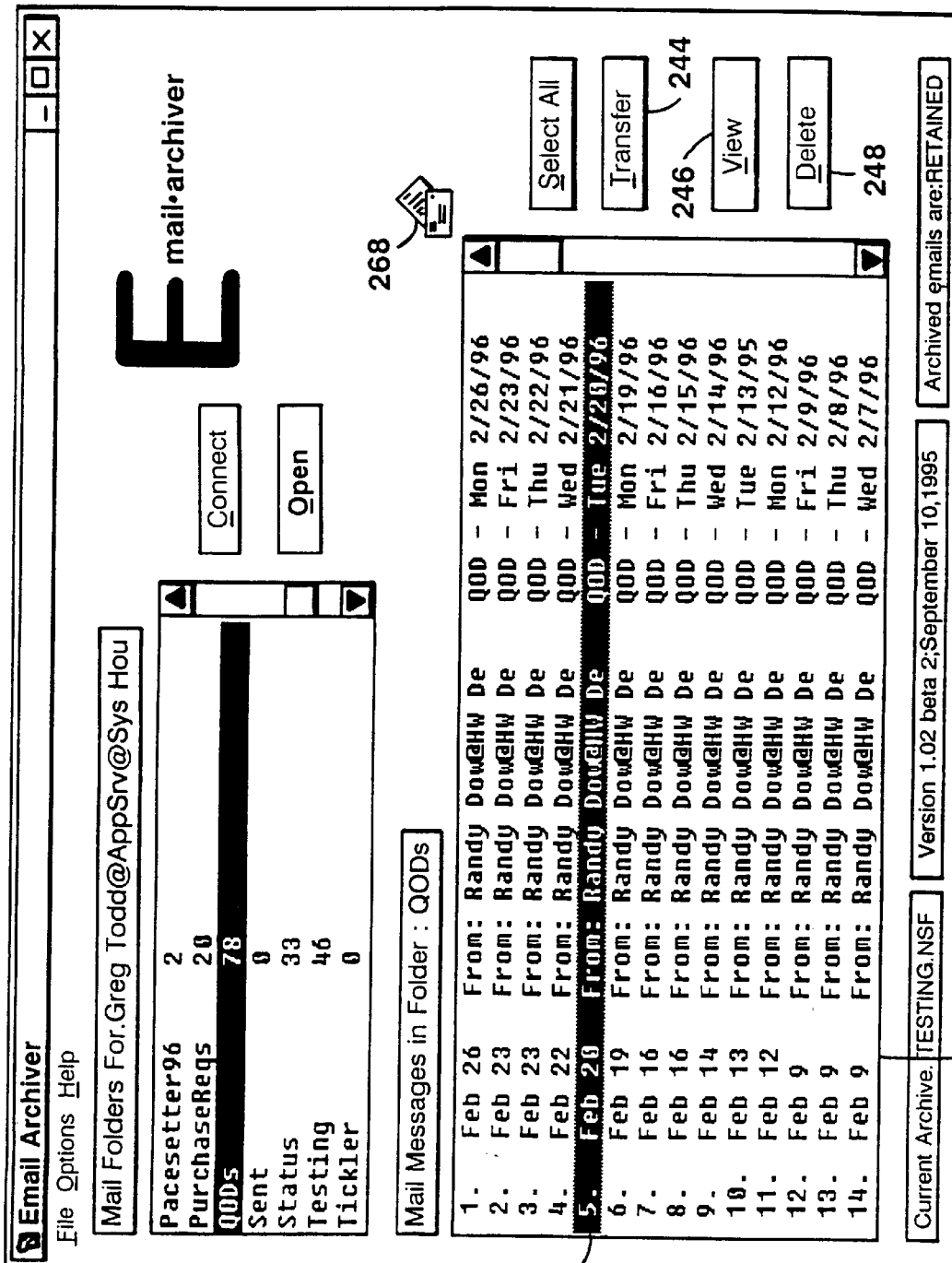
Figure 12:
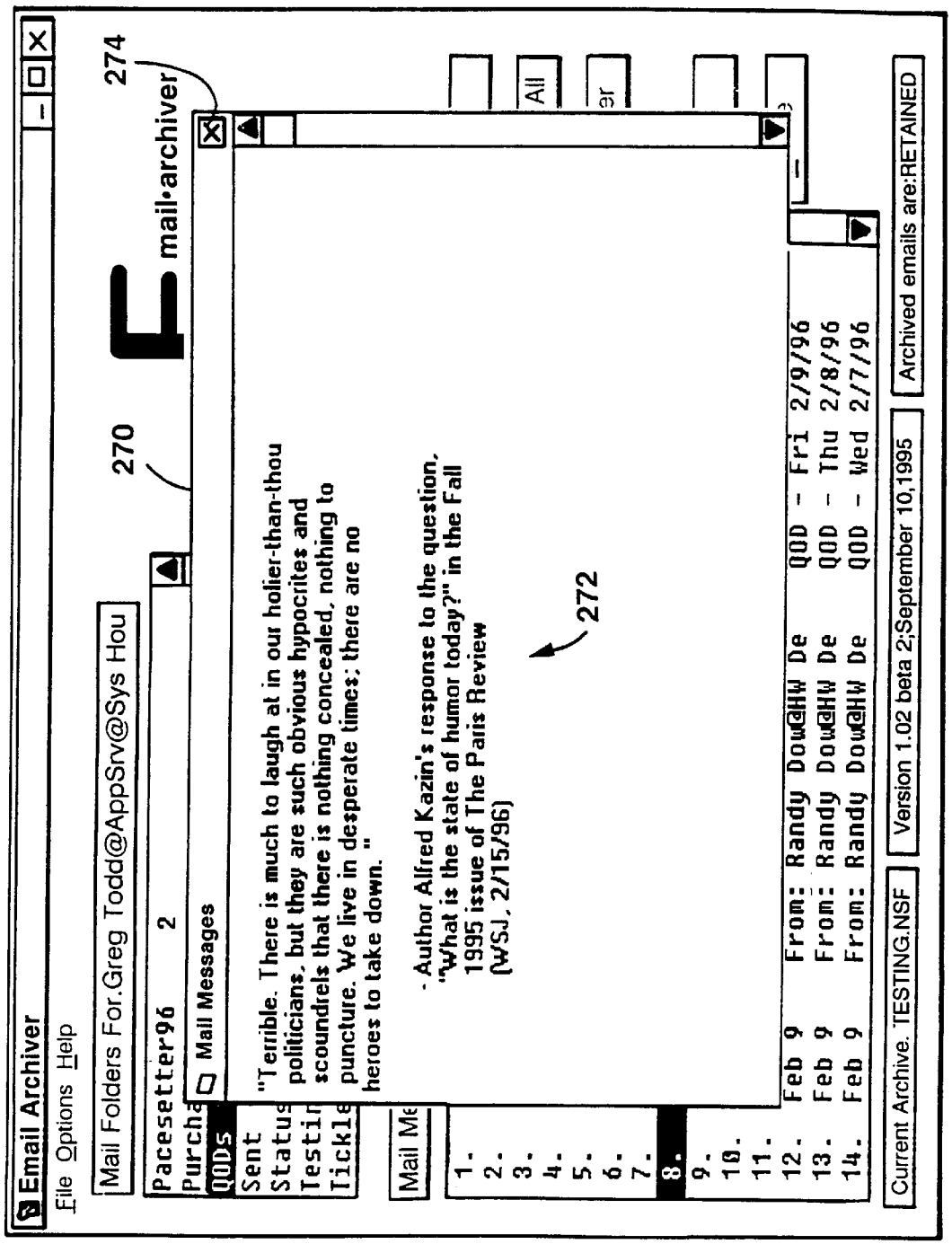
Figure 13A:
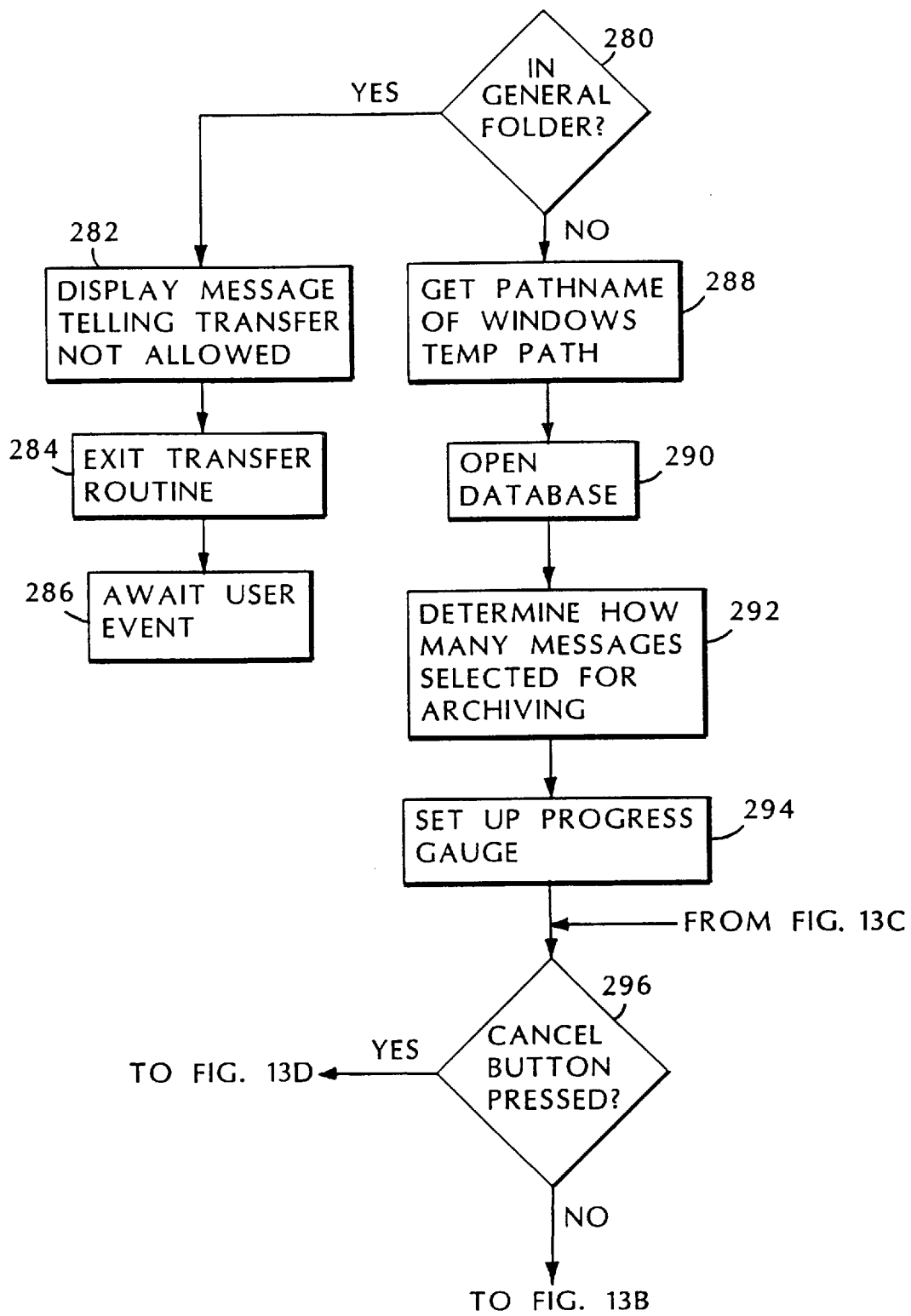
Figure 13B:
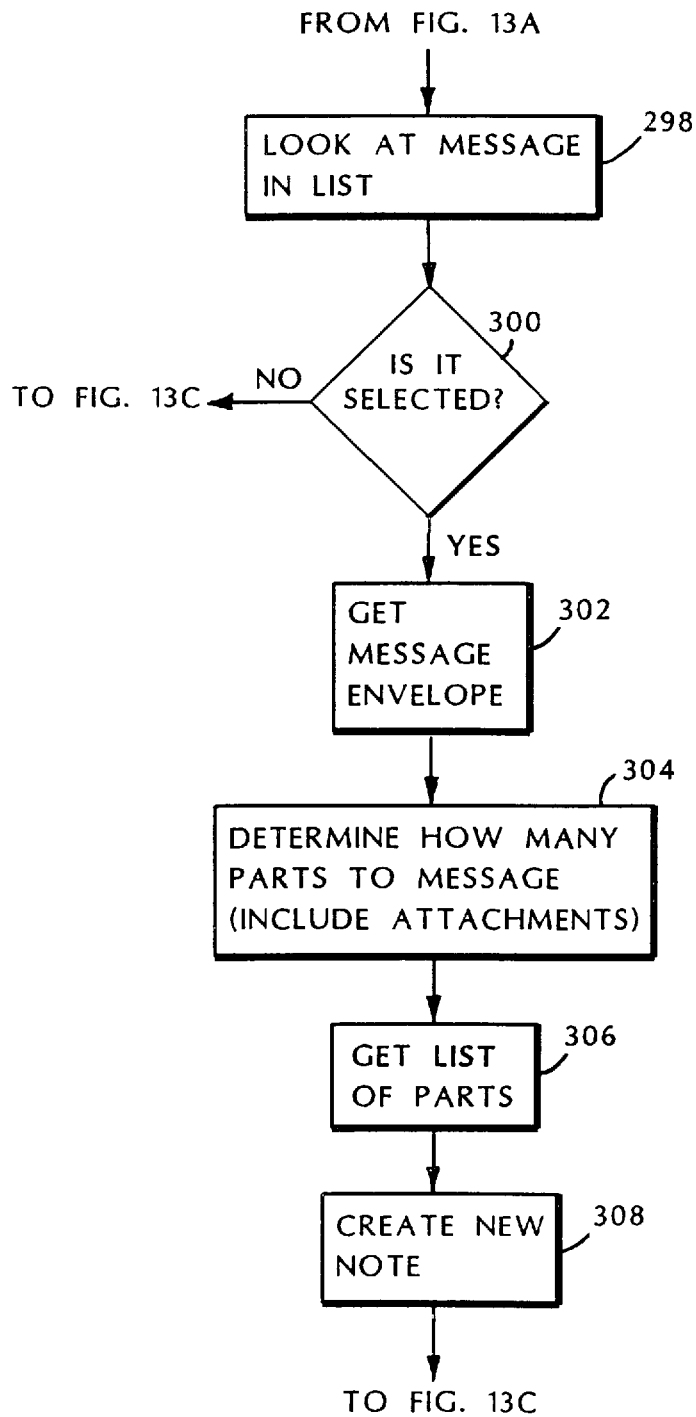
Figure 13C:
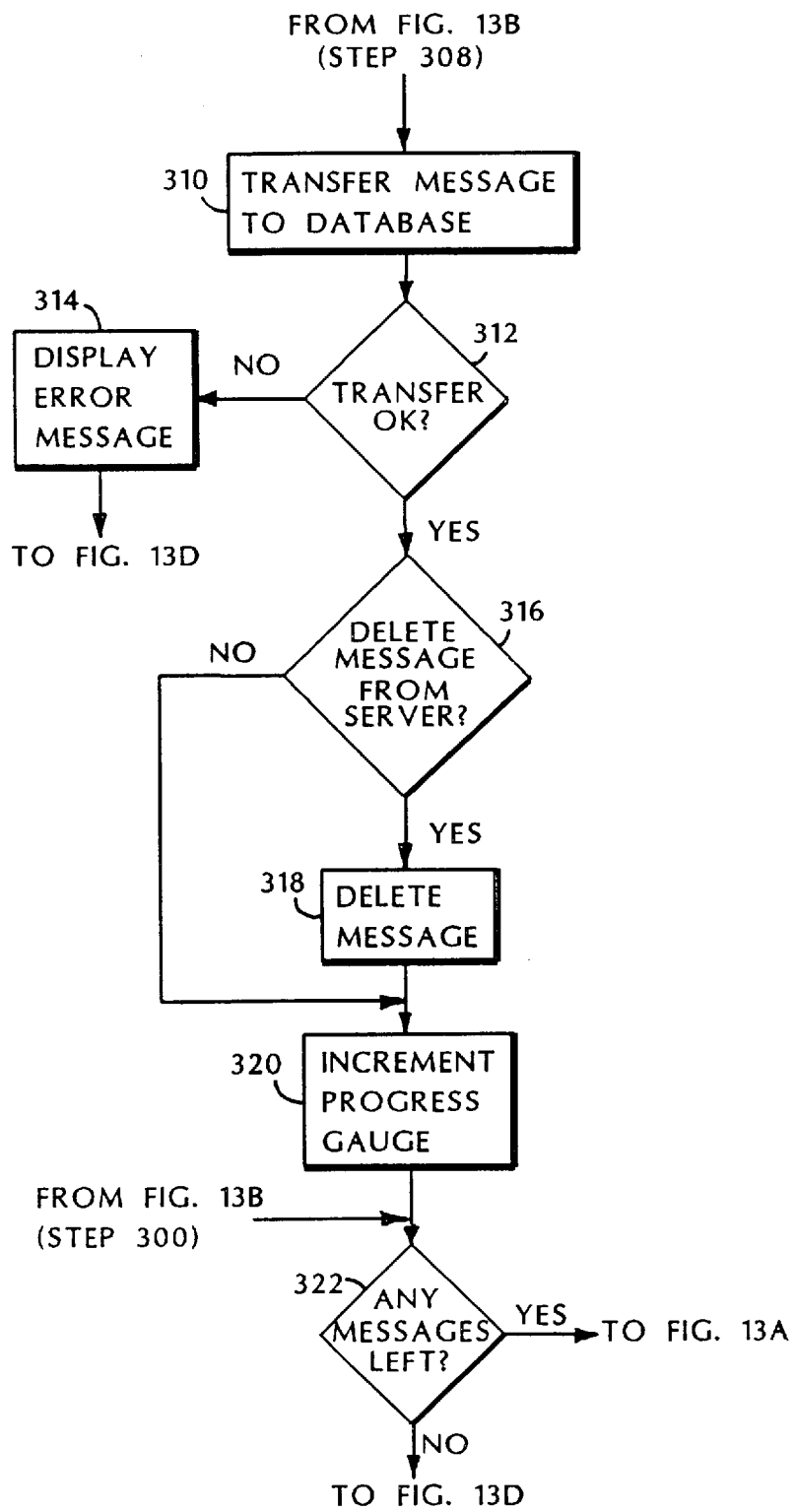
Figure 13D:
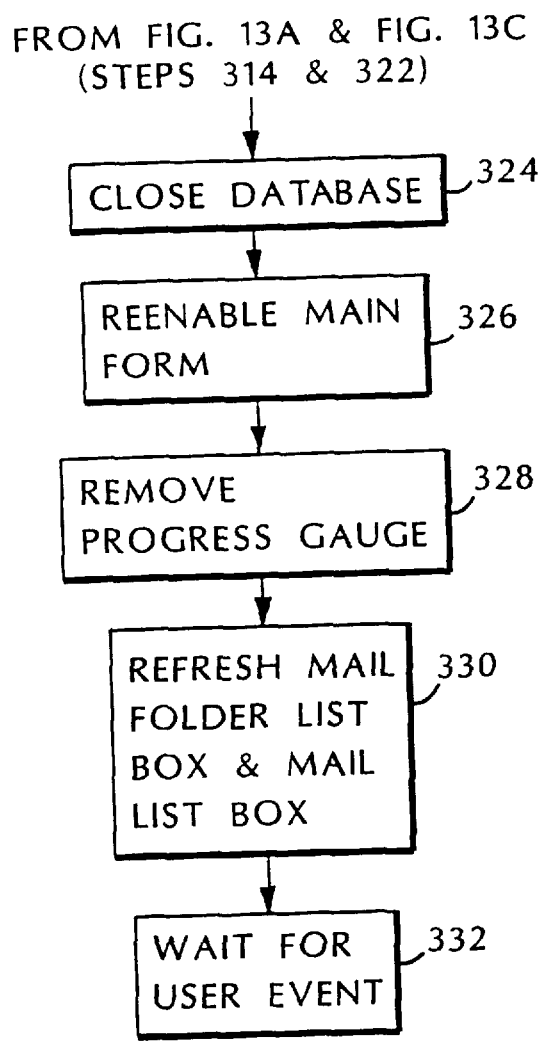

FIGS. 10 through 12 are forms displayed by the graphical user interface.

FIGS. 13A through 13D are a flow diagram of the archiving program.

Figure 14:
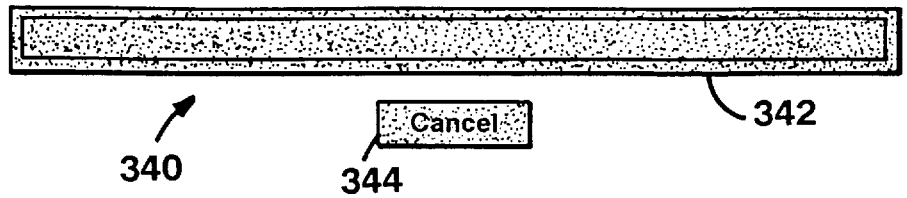

FIG. 14 is a form displayed by the graphical user interface.

Figure 15A:
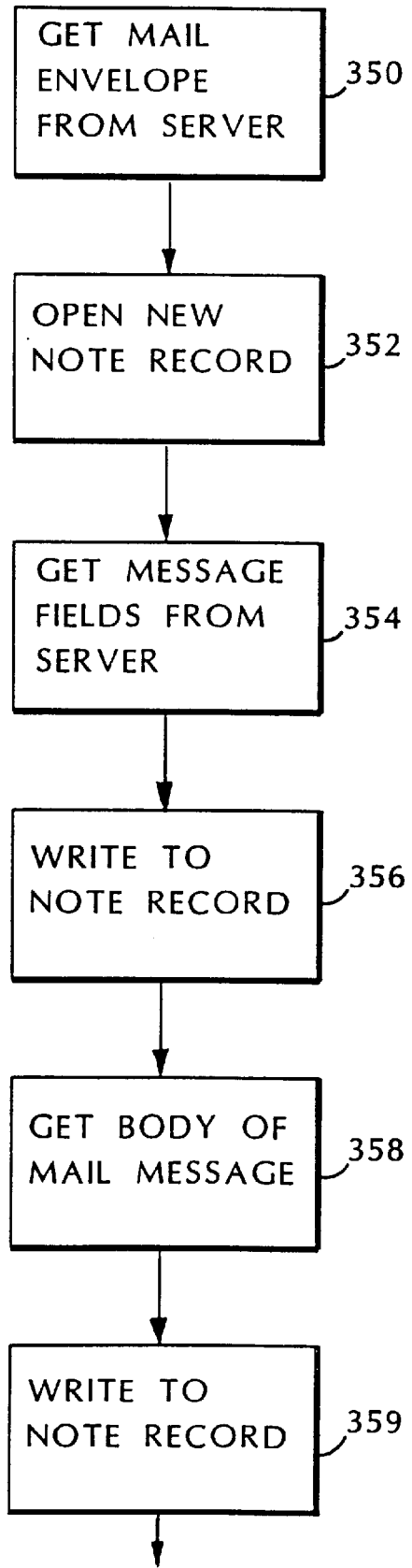
Figure 15B:
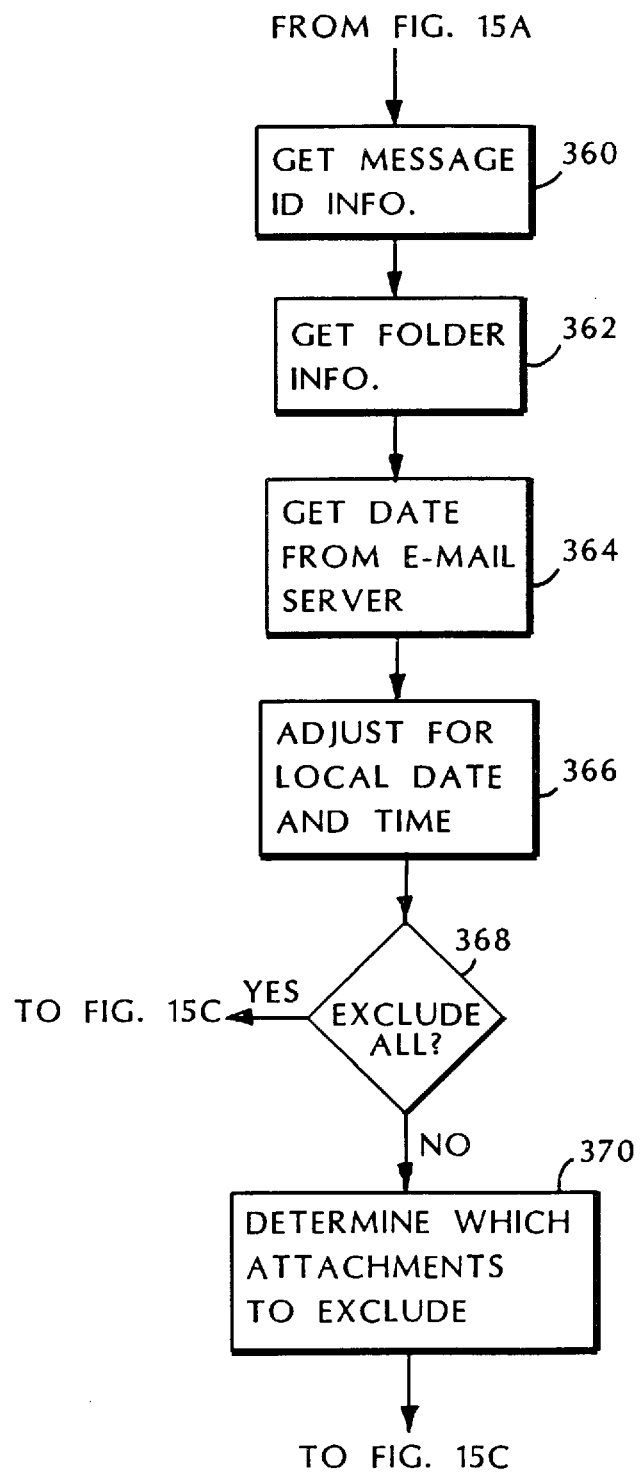
Figure 15C:
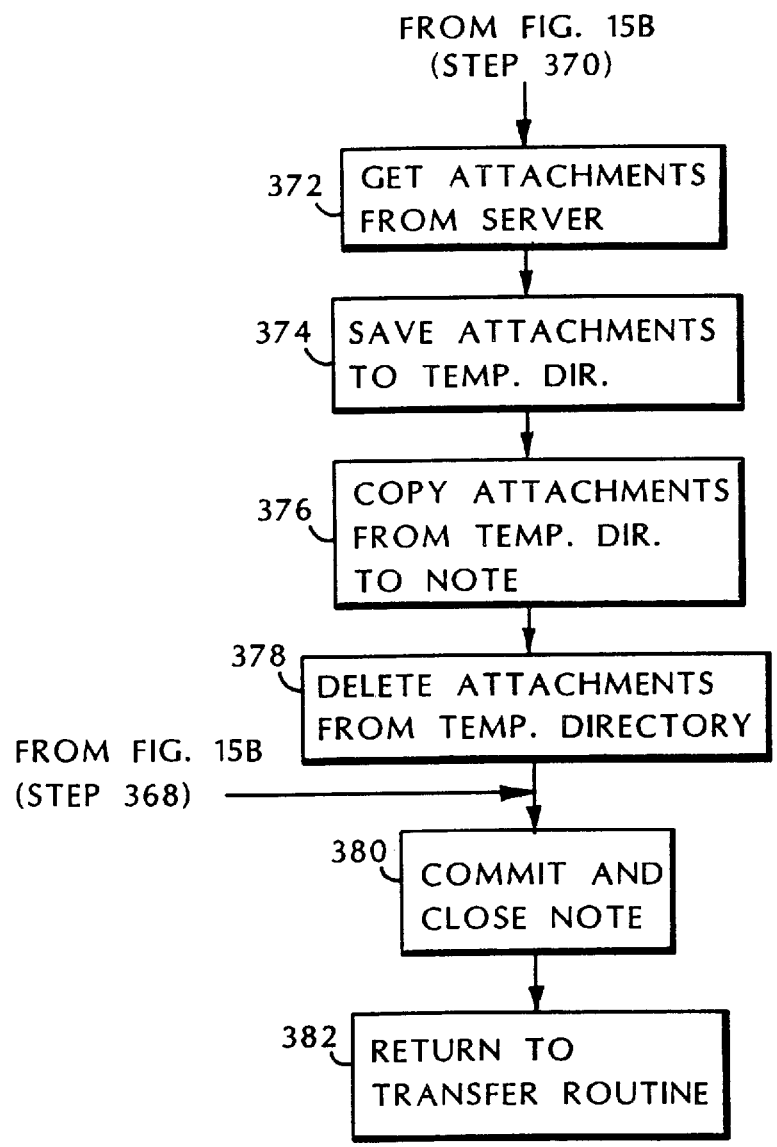

FIGS. 15A through 15C are a flow diagram of the archiving program.

Figure 17:
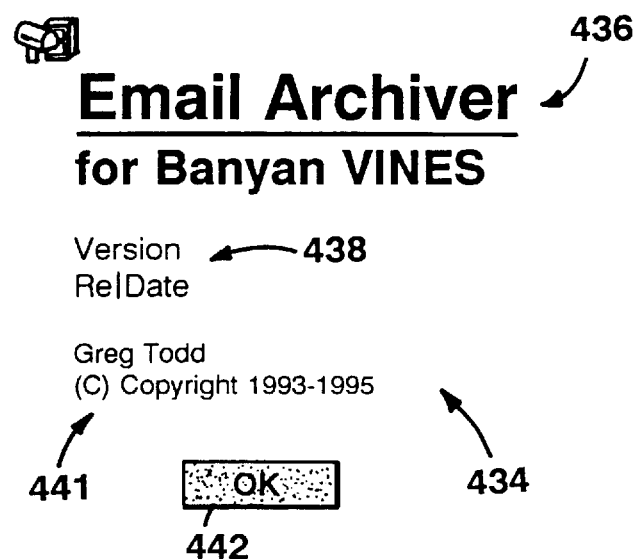
Figure 16:
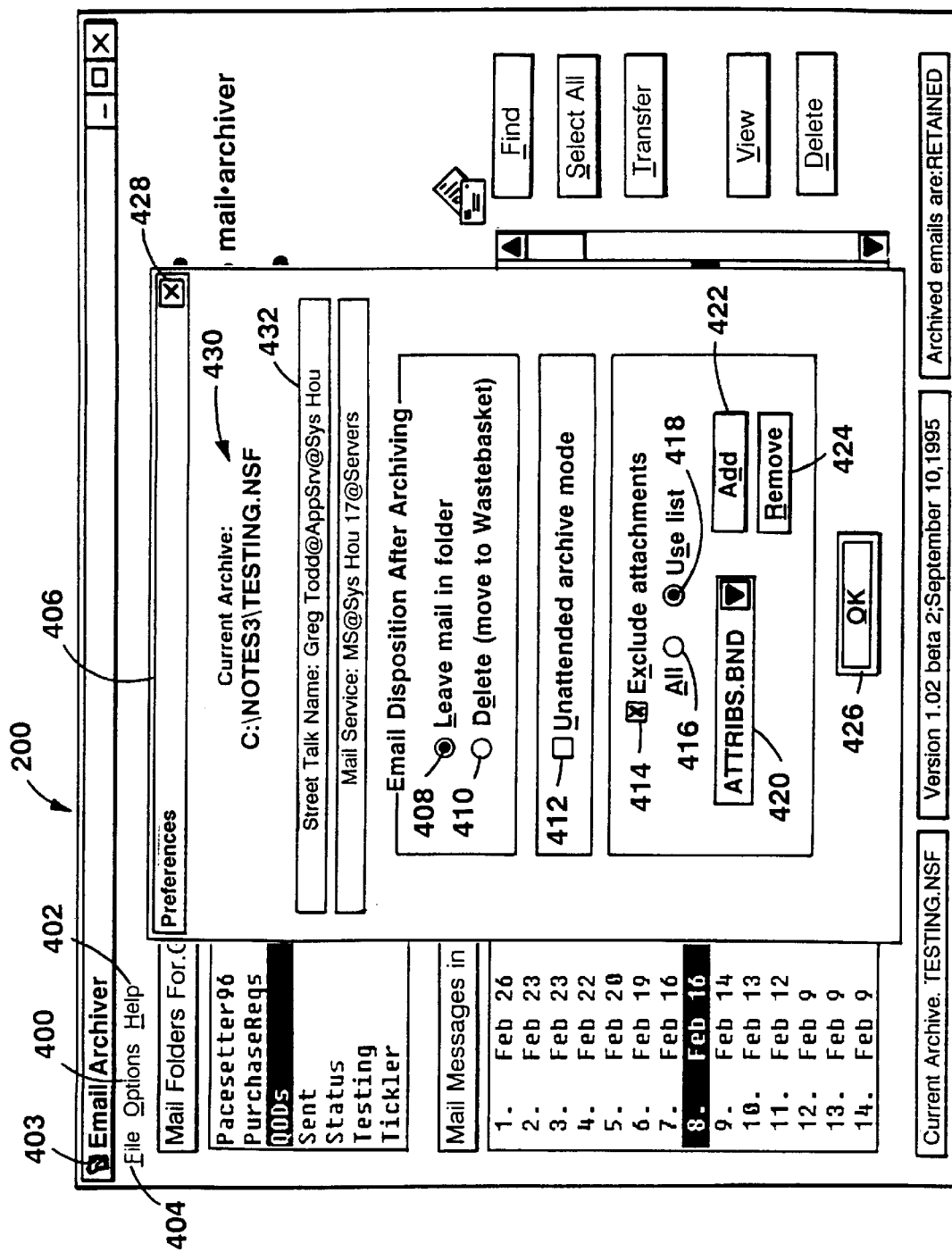
Figure 18:
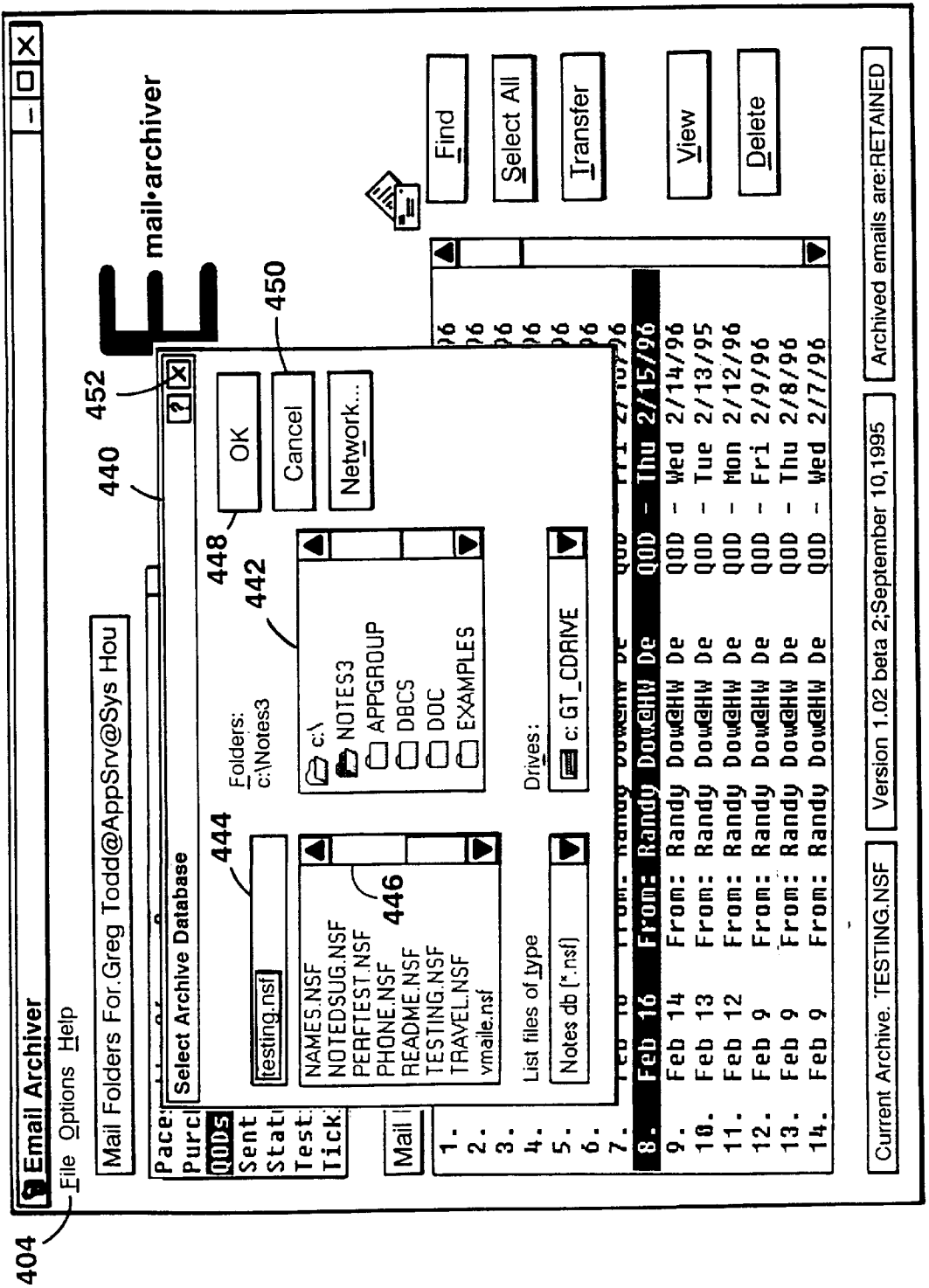

FIGS. 16 through 18 are forms displayed by the graphical user interface.

Figure 19:
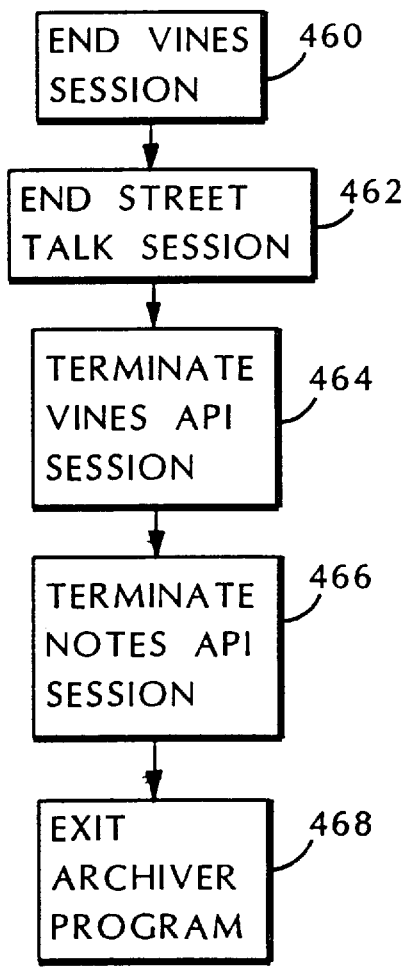

FIG. 19 is a flow diagram of the archiving program.

Figure 1:
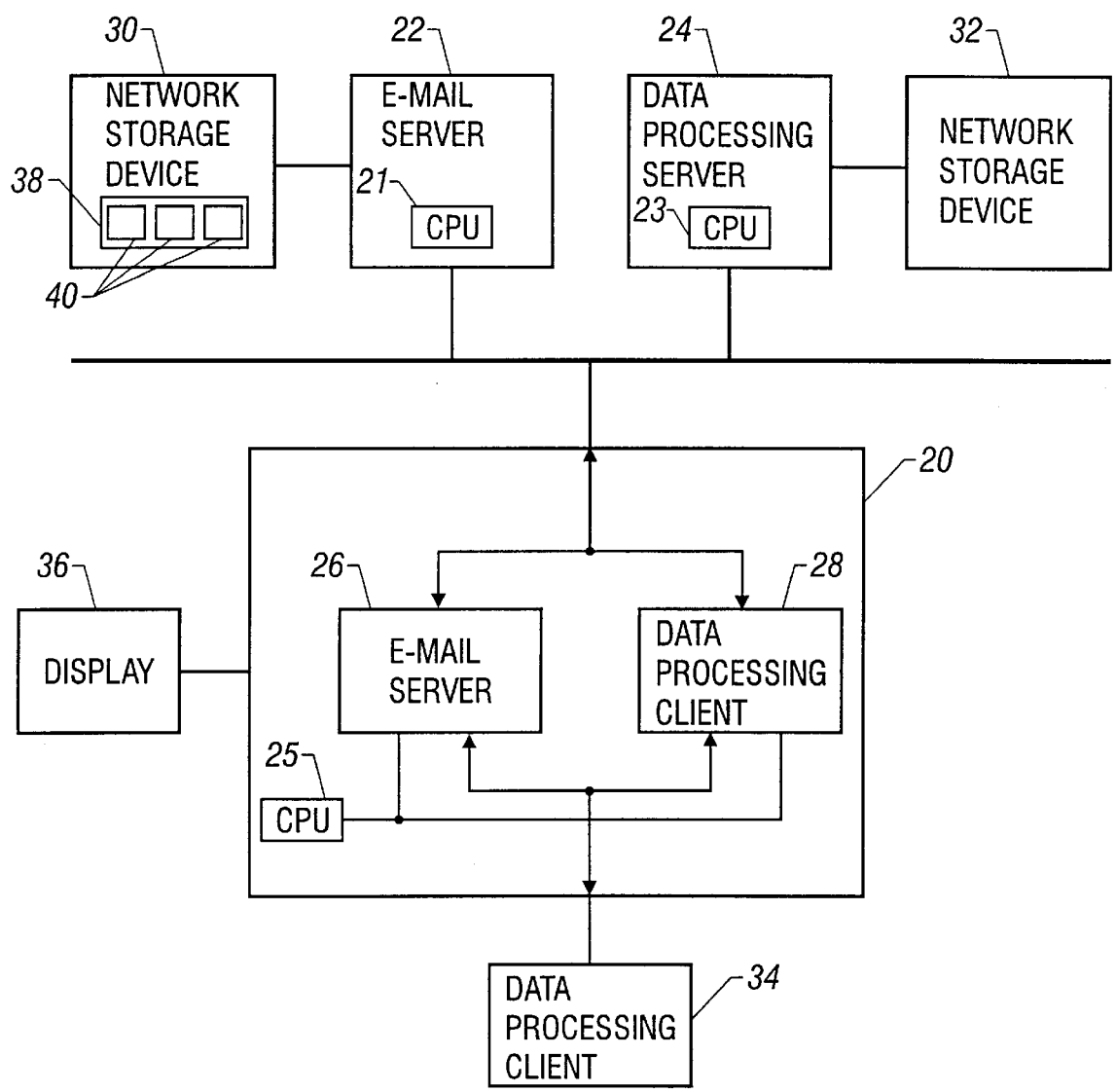
FIG. 1 is a block diagram of a conventional computer network.
Figure 2:
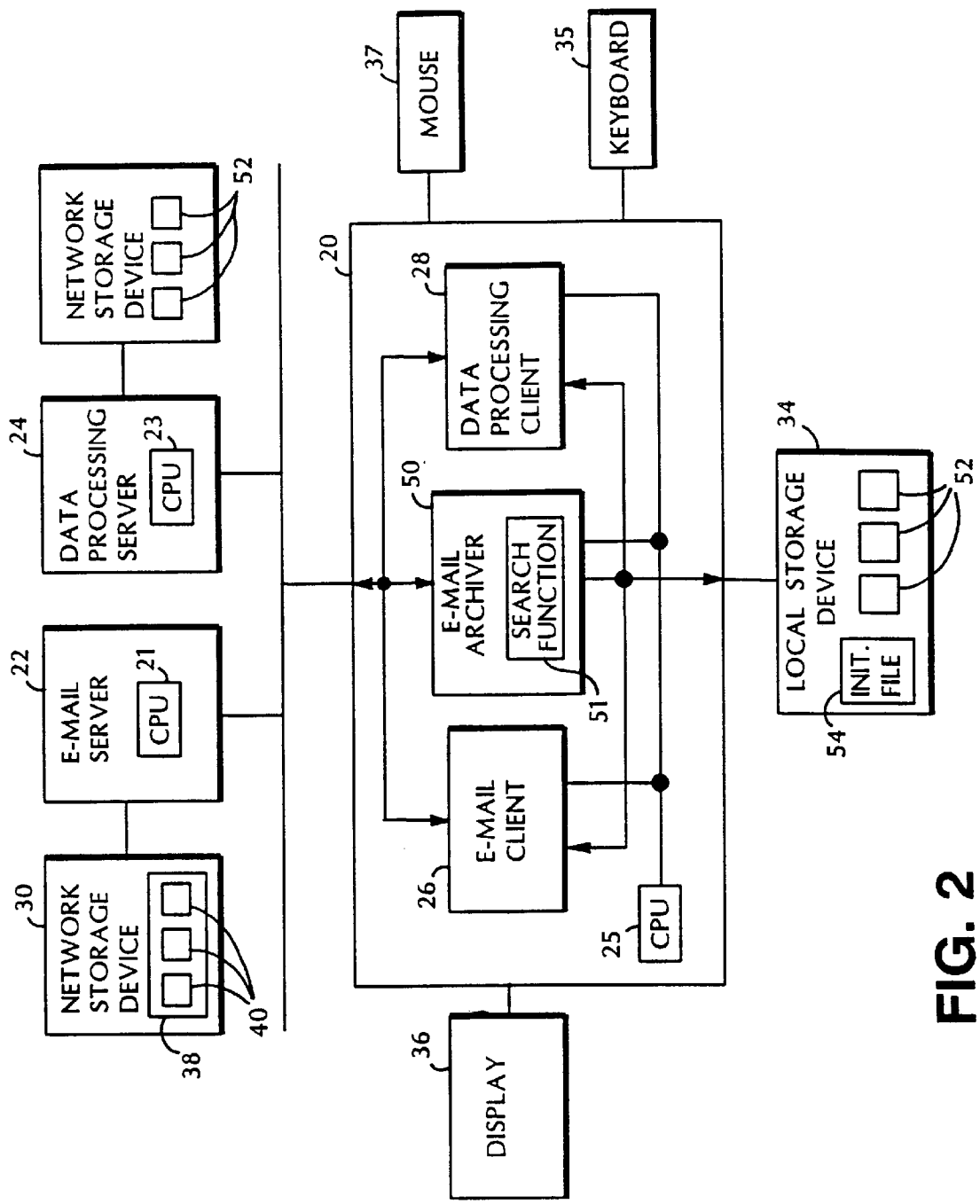
FIG. 2 is a block diagram of a computer network with message archiving capabilities.

Referring to FIG. 2, an electronic mail archiving program 50 installed on a storage medium (e.g., a hard disk) in the client computer 20 converts electronic mail messages 40 stored in the network mailbox 38 into data files 52 understood by the shared information (e.g., data processing) server 24 and client software 28. The archiving program 50 archives the data files 52, and hence the electronic mail messages 40, by storing them on the client computer's local storage device 34 or on the data processing server's network storage device 32. The archived files 52 can be retrieved by the user of the client computer 20 or by users of other network clients (if they are stored on the network storage device 32). An initialization file 54, described below, is maintained on the local storage device 34 for use by the archiving program 50. The user communicates with the client computer 20 through a display 36, a keyboard 35, and a mouse 37. The archiving program 50 instead may be stored on a storage medium in the data processing server 24 or another computer and accessible by the client computer 20.

The electronic mail server 22 may include a standard, "off-the-shelf" mail system such as the Banyan Vines electronic mail application, and the data processing server 24 may include a standard, "off-the-shelf" data processing system, such as the Lotus Notes database application. In this situation, the electronic mail archiving program 50 retrieves selected Vines mail messages 40 from the storage device 30 associated with the Vines server 22, converts them into Notes database records 52, and stores them either on the local storage device 34 or on the storage device 32 associated with Notes server 24. The Notes client package 28 in the client computer 20 or a client package in another client computer may be used to retrieve the archived mail messages 52 and display them to the user. The messages to be archived may be selected using a search function 51 in the archiving program 50 or using the interface described below. The search function 51 may be any standard searching function, such as a "find" function that allows a user to select messages that have a certain characteristic or contain certain information. Such a search function 51 will select messages according to rules or parameters, such as author name or message date, entered by the user.

If the network does not include a Notes server 24, the Notes package 24 installed on the client computer is a stand-alone software package. The e-mail archiver 50 may be a Visual Basic program that runs in the Microsoft Windows operating system.

Figure 3:
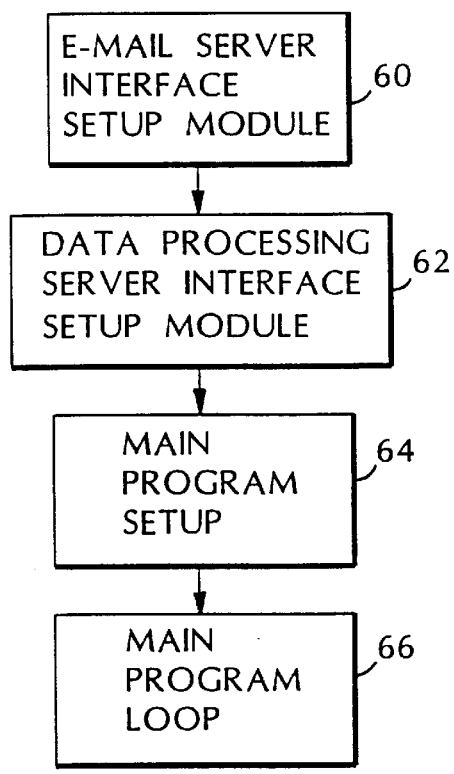

Referring to FIG. 3, the electronic mail archiving program consists of four primary modules. The first two modules, an e-mail server interface module 60 and a data processing server interface module 62, prepare the archiver for communication with the electronic mail server and the data processing server, respectively. In a network that supports Banyan Vines mail, the e-mail server interface module 60 defines various Vines mail structures, such as envelope, body, street talk, and time structures, and declares the standard Vines application programmer's interface (API) functions. In a network that supports Lotus Notes, the data processing server interface module 62 defines various Notes structures, such as database ID and replica database structures, and declares the standard Notes API functions. The remaining modules, a main program setup module 64 and a main program loop module 66, are described in more detail below.

Figure 4:
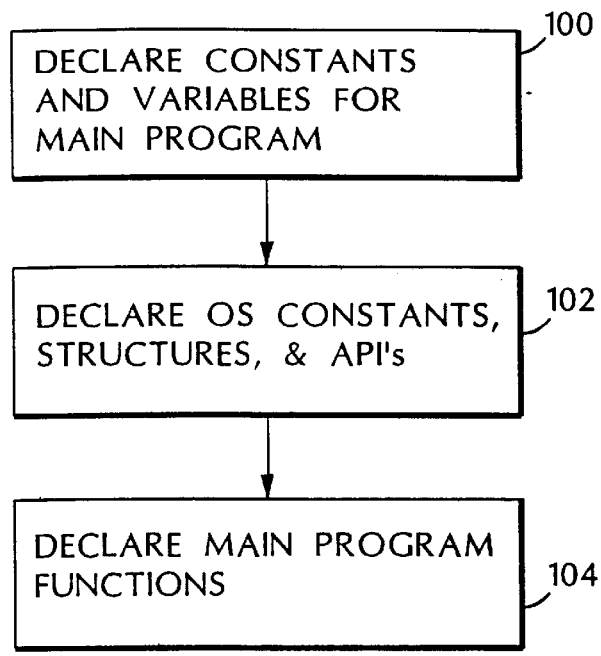
Figure 5A:
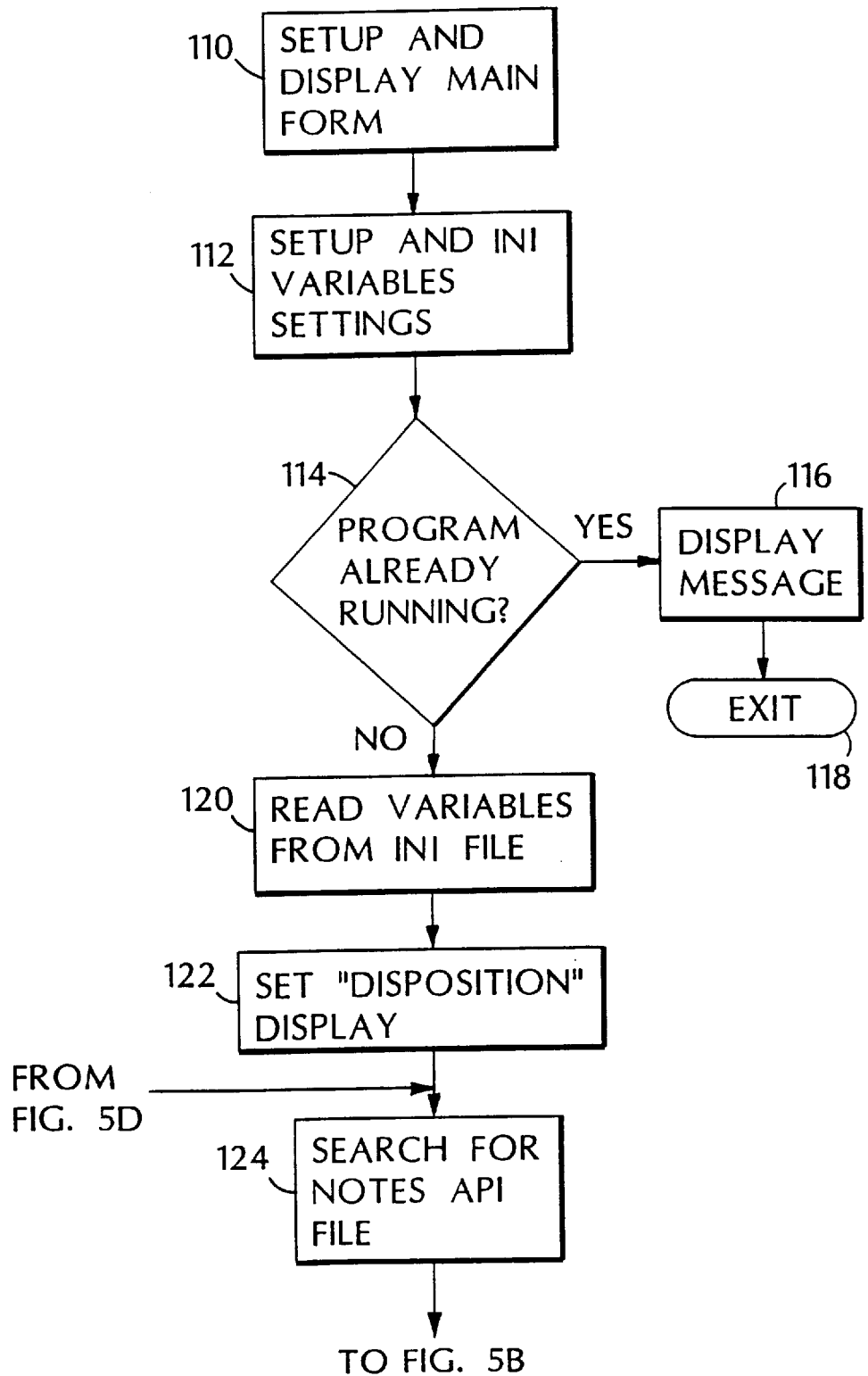
Figure 5B:
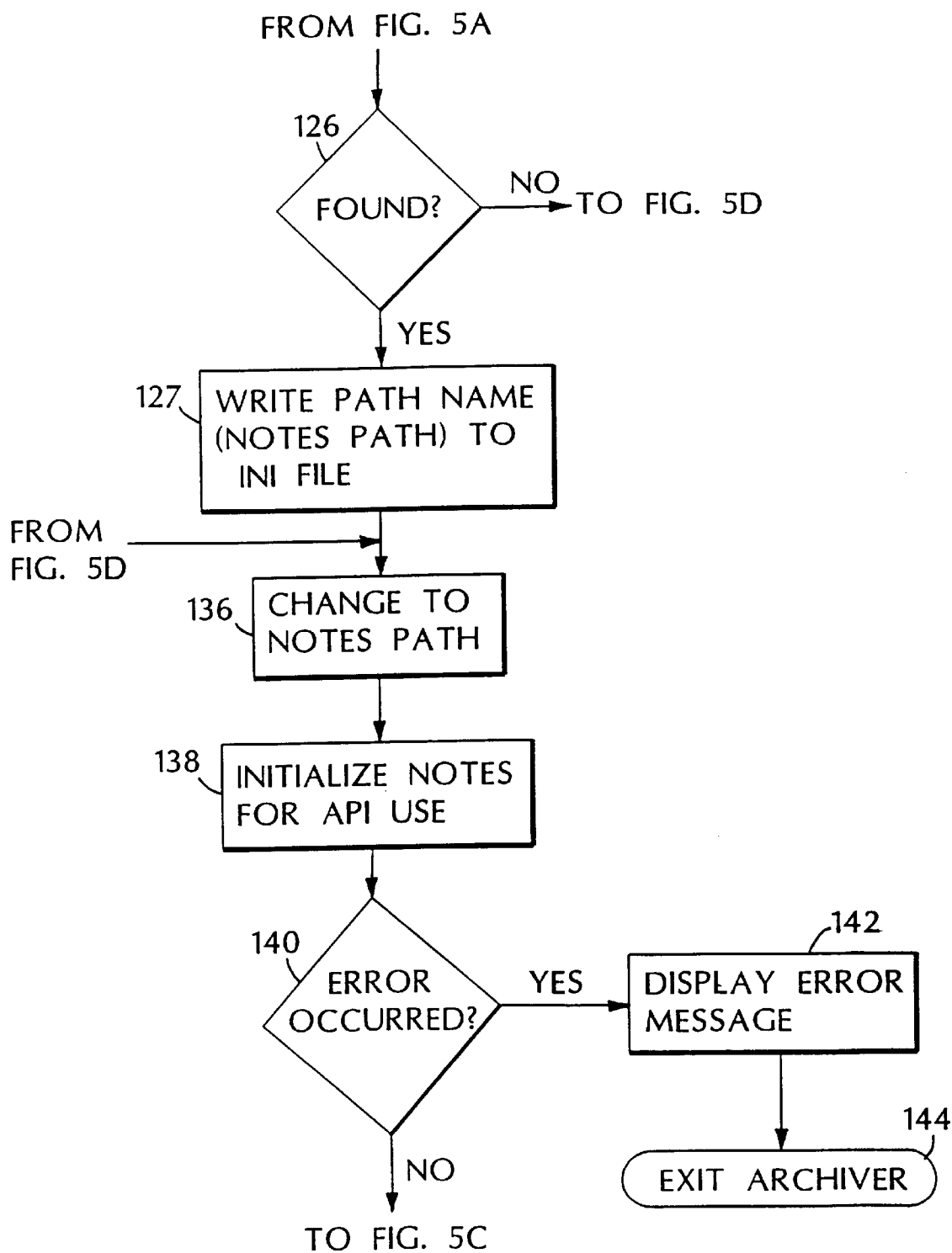
Figure 5C:
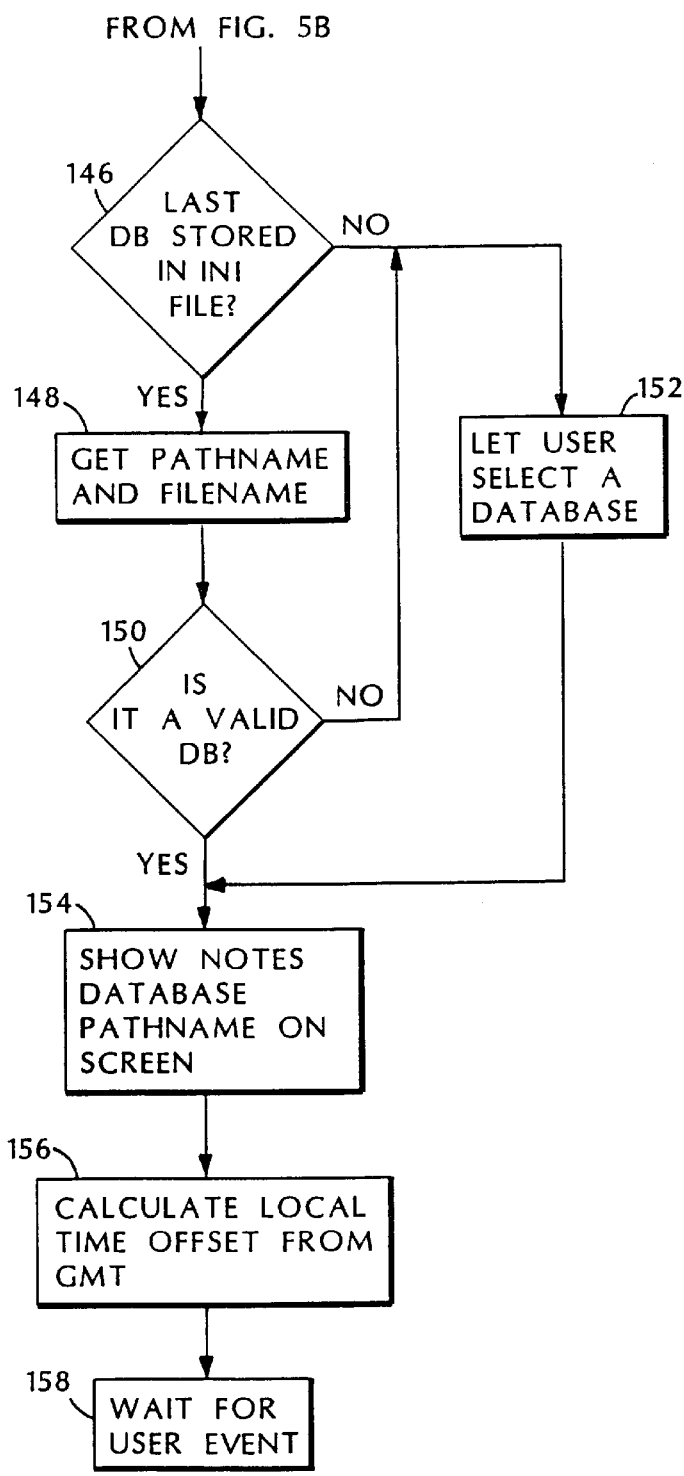
Figure 5D:
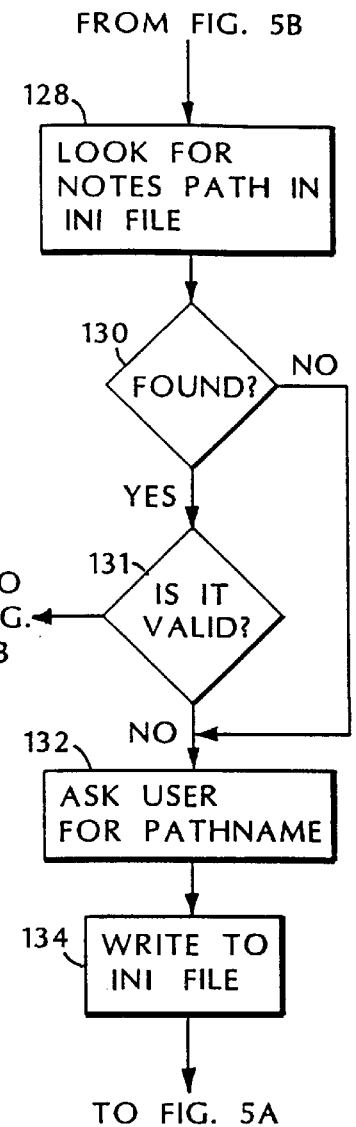

Referring to FIG. 4, the main program setup module performs tasks that allow the program to communicate with the Windows operating system and to interpret and manipulate the information obtained from the Vines and Notes servers. The module's first task is to define 100 the general variables and constants used by the main program. The program constants include, but are not limited to, the version number and release date of the archiver program, the maximum number of electronic mail folders the program will display at once, the name of the initialization file, and the name and design class of the Notes template to be used to archive messages. The program variables include, but are not limited to, the user's Vines mail user name and street talk name, the information included in the initialization file, and an indicator of whether an archive completed successfully.

After defining the general constants and variables, the setup module declares 102 the standard Microsoft Windows API functions that are called by the program and defines the structures and constants that are used to call the declared API functions. The setup module also declares 104 several functions used by the main program to interpret and manipulate information from the Vines and Notes servers. Among these are functions that monitor carriage returns and linefeed characters inserted at the end of Vines mail message lines, display Notes errors that occur as messages are archived, parse text for a particular file's pathname and filename, and properly exit the archiving program.

Referring to FIG. 5, because the archiving program is a Visual Basic program, the main program loop is a loop only in the sense that it performs a predetermined series of tasks and then waits for a user event before acting further. The main program loop first sets up and displays 110 the main form of the graphics/user interface to the user. Referring also to FIG. 6, the main form is a window 200 having several standard features, such as a title bar 202, a menu bar 204, list boxes 206, 208, and several command buttons 210, 212. The list boxes 206, 208 are used to display Vines mail folders and mail messages, respectively, while the command buttons 210, 212 and the items in the menu bar 204 are used to control the archiving process. The main form 200 also displays the filename 214 of the Notes database serving as the currently-opened archive, the archiver program's version information 216, and an indicator 218 of the "disposition" of archived messages, i.e., whether messages are retained or deleted from the Vines server after being archived.

After generating and displaying the main form, the program establishes 112 default values for the initialization file variables. Table I shows the variables associated with the initialization file and their default values.

TABLE I

| Initialization file name (AppINIFile) | EMAILARC.INI |
|---|---|
| Current archive pathname (CurrentNSFPath) | None |
| Current archive name (Current NSFName) | None |

TABLE I-continued

| Notes path (NotesPath) | None |
|---|---|
| Disposition (Disposition) | RETAINED |
| Delete archived messages (DelArchiveMsgs) | False |
| Unattended archiving (Unattended) | False |
| Exclude attachments (ExcludeAtt) | False |
| Exclude all attachments (ExcludeAll) | True |

The program then calls Visual Basic's "App.PrevInstance" function to determine 114 if the archiving program is already running. If so, a message is displayed 116 to inform the user that the archiver already is running and the program is exited 118. If no other instance of the program is running, the program reads 120 the initialization variables from the initialization file. If the program is being run for the first time on the client computer, the initialization file does not exist yet, so the program temporarily uses the default settings for initialization variables. As described in more detail below, the user may select values for the initialization variables while using the program and save these values in the initialization file. If the user does not select values during the first use of the program on the client computer, the default values are saved to the initialization file.

After retrieving the initialization variable parameters, the program fills 122 the value ("DELETED or RETAINED") of the "disposition" variable in the appropriate location 218 of the main form 200 (FIG. 6). The program then searches 124 the client computer for a Notes API file. If the program finds 126 the file, it writes 127 the pathname of the file as the value of the "NotesPath" variable in the initialization file. If the program does not find 126 a Notes API file, it searches 128 the initialization file to see if the "NotesPath" variable contains a pathname to the Notes API file. If a Notes pathname is found 130, the program calls a routine that verifies 131 whether the path is valid. If the path is not valid, or if no pathname is found 130, the program generates a dialog box (FIG. 18) that asks 132 the user to enter a pathname. The pathname entered by the user is then written 134 to the initialization file, and program loops back to test the validity of the entered pathname.

When the program finds a path to the Notes API file, it moves 136 the computer to that directory. The program then initializes 138 Notes for API use. If an error occurs 140 during this initialization, the program displays 142 a message to notify the user of the error and then calls an exit routine (described below) that shuts down 144 the archiver program.

Once Notes is initialized, the program searches 146 the "CurrentNSFPath" and "CurrentNSFName" variables in the initialization file for the last Notes database used to store archived messages. If a database is found, the program retrieves 148 the pathname and filename of the database. The program then calls a routine that verifies 150 whether the database is a valid Notes database. If not, or if the program did not find a database in the initialization file, the program generates a dialog box (FIG. 18) that asks 152 the user to enter an archiving database. The program then fills 154 the name of the archiving database in the appropriate location 214 (FIG. 6) on the main form 200 (FIG. 6). Finally, the main program loop calculates 156 the local time and date offset from Greenwich Mean Time (GMT) and waits 158 for a user event.

Referring again to FIG. 6, the user has three options from the main form 200. The user may select one of the standard Windows minimize, maximize, or close buttons 219, may browse through the menus (described below) listed in the menu bar 204, or may use the mouse to click the activated "Connect" button 210.

Referring also to FIGS. 7 and 8, when the user selects the "Connect" button, the program calls a routine that attaches the computer to the Vines electronic mail server. In this routine, program uses Vines API calls to retrieve 220 user's electronic mail ID, to retrieve 222 the user's street talk name, to start 224 a Vines mail session, and to start 226 a street talk session. The program then retrieves 228 the names 239 of all of the mail folders in the user's Vines mailbox and lists 230 the mail folders in a "Mail Folders" list box 240 in the main form 200. Finally, the program deactivates the "Connect" command button 210 and waits 234 for the user to act. Once the computer is connected to the mail server, if the user clicks once on one of the folder names 242, the program activates an "Open" command button 212 and makes sure a "Select All" button 242, a "Transfer" button 244, a "Find" button 245 (if present), a "View" button 246, and a "Delete" button 248 are deactivated.

Referring to FIGS. 9 and 10, if the user selects the "Open" button 212 or double clicks on a folder name 260, the program calls a routine that opens the selected folder 260 and displays its contents. First, the program clears 250 a "Mail Messages" list box 262 in the main form 200. The program then uses Vines API calls to retrieve 252 message header information 264 (including date, sender's name, subject, etc.) for every message stored in the selected folder 260 on the Vines mail server. The message header information 264 is displayed 254 in the "Mail Messages" list box 262. The program then activates 255 the "Select All" button 242. If the archiving program includes 256 a search function, a "Find" button 245 also is activated 257. The program then waits 258 for a user event to occur. If the user selects the "Find" box, a dialog window will pop up to allow the user to enter the rules or parameters to be used to select one or more of the messages 264 in the list box 262. If the user selects the "Select All" button 242, the program selects all of the messages 264 in the list box 262 and activates the "Transfer" button 244.

Referring to FIG. 11, if the user clicks once on a listed mail message 266, the program activates the "Transfer" button 244, the "View" button 246, and the "Delete" button 248. If the selected message 266 includes any attachments, the program also displays an icon 268 that notifies the user that attachments exist. Once a message is selected, selecting the "Transfer" button calls a routine (described below) that archives the selected message 266. If the user selects the "Delete" button 248, the program calls a routine that uses a Vines API to delete the selected message 266 from the Vines server and remove it from the "Mail Messages" list box 262. Referring also to FIG. 12, if the user selects the "View" button 246 or double clicks on the selected message 266, the program opens a message viewing form 270, calls a Vines API that retrieves the body of the selected message 266 from the Vines server, and displays the message body 272 in the message viewing form 270. The user can close the message viewing form by selecting the Microsoft Windows close button 274 in the upper right corner of the form 270 or by pressing the "Escape" key on the computer's keyboard (not shown).

Referring to FIG. 13, when the user selects the "Transfer" button 244 (FIG. 11), the program calls a transfer routine that archives all selected messages in the current archiving database. When the program first enters the routine, it checks 280 to make sure the selected folder is not the user's "General" folder (or "Inbox"). Preferably, messages are not archived directly from the "General" folder, but rather must be moved to another folder first. If the selected folder is the "General" folder, the program displays 282 a message informing the user that a transfer is not allowed, exits 284 the subroutine, and awaits 286 a user event.

If the selected folder is not the "General" folder, the program uses a Windows API call to retrieve 288 the pathname of the Microsoft Windows temporary ("temp") directory and a Notes API call to open 290 the archiving database. Referring also to FIG. 14, the program then determines 292 how many messages the user has selected for archiving and creates 294 a "Progress Label" form 340, which includes a progress meter 342 and a "Cancel" button 344. The progress meter 342 provides a running display of the progress of the archiving process. The "Cancel" button 344 allows the user to stop the archiving process midstream.

Once the "Progress Label" form 340 is displayed, the program checks 296 to see if the user has pressed the "Cancel" button 344. If so, the program stops the archiving process and exits the transfer routine, as described below (FIG. 19). As long as the user has not pressed the "Cancel" button 344, the program looks 298 at the first message in the folder to determine 300 whether the message is selected for archival. If not, the program looks at the next message, if any, in the folder. If the message is selected, the program uses Vines API calls to retrieve 302 the corresponding message envelope, determine 304 how many parts the message contains (including attachments), and build 306 a list of the message parts. The program then uses a Notes API call to create 308 a database entry (i.e., a new "Note") and calls a transfer subroutine (described below) to transfer 310 the message into the new database record.

If an error occurs 312 during the transfer, the program displays 314 a message notifying the user of the error and exits the transfer routine, as described below (FIG. 19). If the transfer completes successfully, the program determines 316 if the user wants to delete the message. If so, the program uses a Vines API call to delete 318 the message. The program then increments 320 the progress meter 342 (FIG. 14) and determines 322 if there are any messages remaining in the folder. If so, the program loops back to determine 296 whether the user has pressed the "Cancel" button 344 (FIG. 14) and then exits or proceeds with the archiving process accordingly.

After the program has looped through all of the messages in the selected folder, or if the user presses the "Cancel" button or an error occurs during the archiving process, the program closes 324 the archiving database. The program then reenables 326 the main form, removes 328 the "Progress Label" form 340 (FIG. 14), and refreshes 330 the main form, including the "Mail Folders" list box and the "Mail Messages" list box. If the messages were deleted from the folder as they were archived, the "Mail Messages" list box will now be empty. The program then awaits 332 another action by the user.

Referring to FIG. 15, when the program enters the message transfer subroutine, it first retrieves 350 the message envelope from the Vines server using a Vines API call. The program then uses a Notes API call to open 352 a new Notes record. When the new record is open, the program retrieves 354 the message header fields (i.e., "To", "CC", "BCC", "From", "Subject", "Certified", "Date", and "Forwarded by") and writes 356 them into the Notes record. The program then retrieves 358 the body of the message and writes 359 it into the Notes record. Likewise, the program retrieves 360, 362 the message ID and folder information from the Vines server. The program then retrieves 364 date and time information from the server and adjusts 366 this information to correspond to the local date and time. Mail messages are copied to the archiving database in 1024 byte segments.

The program then looks at the "ExcludeAll" variable in the initialization file to determine 368 whether it is to exclude all attachments from the archived message. If not, it determines 370 which, if any, attachments to exclude. The program then retrieves 372 all non-excluded attachments from the Vines server and saves 374 them to the Windows temporary directory. The attachments are then copied 376 into the Notes record and deleted 378 from the temporary directory. After the attachments are copied, or if the attachments are excluded, the program commits and closes 380 the Note and returns 382 to the main transfer routine. By archiving each message in a separate note, the archiving program preserves each message as a separate entity, distinct from other archived messages.

Referring to FIG. 16, the user is able to select and store archiving parameters by entering the "Options" menu 400 and pulling up a "Preferences" form 406. The "Preferences" form 406 allows the user to select values individually for the initialization variables and store the values in the initialization file. For example, the user selects the value of the "Disposition" variable by setting either a "Leave mail in folder" radio button 408 (Disposition="RETAINED") or a "Delete" radio button 410 (Disposition="DELETED"). Likewise, the user sets the "Unattended" variable by either selecting (Unattended="TRUE") or leaving unselected (Unattended="FALSE") an "Unattended archive mode" button 412. When the "Unattended archive mode" button 412 is selected, the archiving program automatically retrieves and archives every electronic mail message received by the user without further intervention by the user. The user also can select whether attachments are excluded, and if so, which are excluded. If the user sets the "Exclude attachments" button 414, the "ExcludeAtt" variable is set to "TRUE" (otherwise the "ExcludeAtt" variable is set to "FALSE"). The user then may select either the "All" radio button 416, which sets the "ExcludeAll" variable to "TRUE", or the "Use list" radio button 418, which sets the "ExcludeAll" variable to "FALSE". If the user selects the "Use list" button 418, a list 420 of files to exclude is displayed. The user can add or remove files from the list by clicking on a selected file and then selecting the "Add" button 422 or the "Remove" button 424, respectively.

When the user has finished setting the archiving parameters, the user may store the parameters and the exclusion files to the initialization file and then exit the "Preferences" form 406 by selecting the "OK" button 426. Alternatively, the user also may select the Windows close button 428 in the upper right corner of the form 406 to exit the form 406 without saving the newly selected parameters.

The "Preferences" form 406 also displays various archiving information, such the pathname and the filename of the current archive 430 and the user's street talk and mail service information 432.

Referring also to FIG. 17, the "Help" menu 402 contains an entry that allows the user to retrieve information from the standard Windows "Help" file and an entry that, when selected, calls a subroutine that generates an "About" form 434 that displays information about the archiver program. This information includes, but is not limited to, the name 436 of the program, its version and release information 438, and its copyright information 441. An "OK" button 442 allows the user to exit the "About" form 434 and return to the main form.

Referring to FIG. 18, the "File" menu 404 includes a "Select Database" submenu which invokes a "Select Archive Database" form 440 that allows the user to select an archiving database. This form 440 also is invoked when the program is unable to find a current archiving database in the main program loop (FIG. 5). The form 440 contains list boxes that allow the user to select, among other things, the directory 442 containing the archiving database and the filename 444 of the database. The form 440 also includes a box 446 that lists several databases that the user may choose from. Once the filename 444 of the archiving database is selected, the user can save the pathname and filename to the initialization file and exit the "Select Archive Database" form 440 by selecting the "OK" button 448. Alternatively, the use may exit the "Select Archive Database" without saving by selecting the "Cancel" button 450 or the Windows close button 452.

Referring also to FIG. 19, when the user chooses "Exit" from the "File" menu 404, the program calls an exit routine that properly shuts down the program and exits to Windows. This routine also is called when the archiver is exited from elsewhere in the program. When the exit routine is called, the program closes 460 the Vines mail session, closes 462 the street talk session, terminates 464 the Vines API session, and terminates 466 the Notes API session, if open. The program then shuts 468 itself down and returns control to Windows.

Other embodiments are within the scope of the following claims. For example, the archiving program may be written in programming languages other than Visual Basic and used with operating systems other than Windows.

What is claimed is:

1. A method for sharing an electronic mail message with a party not named as a recipient of the message, comprising:
   allowing a user to identify the electronic mail message to be shared, and
   thereafter without intervention by the user:
      automatically converting the message from an electronic mail format to a shared information format defined by a shared information application,
      automatically storing the converted message in a shared information system capable of running the shared information application, and
      automatically making the stored message accessible to the party not named as a recipient of the message.

2. The method of claim 1 wherein allowing a user to identify the electronic mail message comprises receiving a user-indicated characteristic of the message.

3. The method of claim 2 further comprising using a search function to select the electronic mail message from a group of messages based on the user-indicated characteristic.

4. The method of claim 2 further comprising using a search function to select from a group of messages an additional message to be shared based on the user-indicated characteristic.

5. The method of claim 1 wherein the shared information application comprises a shared database program.

6. The method of claim 1 wherein the shared information application comprises Lotus Notes.

7. A method for automatically archiving an electronic mail message transmitted in an electronic mail format, comprising:

allowing a user to identify the electronic mail message to be archived, and thereafter without intervention by the user:

automatically converting the electronic mail message from the electronic mail format into a format defined by a data processing application, and automatically archiving the converted message in a storage device accessible by a data processing system capable of running the data processing application.

8. The method of claim 7 wherein allowing a user to identify the electronic mail message comprises receiving a user-indicated characteristic of the message.

9. The method of claim 8 further comprising using a search function to select from a group of messages an additional message to be shared based on the user-indicated characteristic.

10. The method of claim 8 further comprising using a search function to select the electronic mail message from a group of messages based on the user-indicated characteristic.

11. The method of claim 7 wherein allowing a user to identify the electronic mail message comprises receiving an instruction from the user to archive all messages.

12. The method of claim 7 further comprising automatically applying an instruction from a user governing the manner of archiving the message.

13. The method of claim 12 wherein the instruction identifies a component of the message to be excluded when the message is archived.

14. The method of claim 12 wherein the instruction indicates whether the message is to be deleted from an electronic mail system when the message is archived.

15. The method of claim 12 wherein the instruction identifies a location to archive the message in the storage device.

16. The method of claim 7 wherein the storage device is connected to a network client computer.

17. The method of claim 7 wherein the storage device is connected to a network server computer.

18. The method of claim 7 wherein the data processing application comprises a database application.

19. The method of claim 7 wherein the storage device in which the converted message is archived is not used to store the electronic mail message in the electronic mail format.

20. A method for storing an electronic mail message received in an electronic mail format, comprising:

allowing a user to provide an instruction governing the manner of storing the message, and thereafter based on the user's instruction:

automatically converting the message from the electronic mail format into a format defined by a data processing application, and automatically storing the converted message in a storage device accessible by a data processing system capable of running the data processing application.

21. The method of claim 20 wherein the instruction provided by the user identifies a component of the electronic mail message to be excluded when the message is stored in the storage device.

22. The method of claim 20 wherein the instruction identifies a location in the storage device to store the converted message.

23. The method of claim 20 wherein the instruction indicates whether the electronic mail message is to be deleted from an electronic mail system when the message is stored in the storage device.

24. The method of claim 20 further comprising insuring that the stored electronic mail message remains distinct from other electronic mail messages that are stored in the storage device.

25. A method of increasing available storage space in an electronic mail system in a computer network, comprising:

identifying a network user that is an intended recipient of an electronic mail message stored in the electronic mail system, automatically converting the electronic mail message from an electronic mail format into a format defined by a data processing application preferred by the user, and automatically storing the converted message in a storage device attached to a network client computer associated with the user.

26. The method of claim 25 further comprising retrieving stored information provided by the user governing the manner of converting and storing the message.

27. The method of claim 26 wherein the stored information identifies a component of the message to be excluded when the message is stored.

28. The method of claim 26 wherein the stored information indicates whether the message is to be deleted from an electronic mail system when it is stored in the storage device.

29. The method of claim 26 wherein the information identifies a location in the storage device to store the converted message.

30. The method of claim 26 wherein the information identifies the data processing application preferred by the user.

31. An electronic mail archiver for use in a computer system, comprising:

a user interface that allows a user to identify an electronic mail message to be archived from an electronic mail system, and a message transfer component that automatically retrieves the message from the electronic mail system in an electronic mail format and stores the message in a format defined by a data processing application capable of running in the computer system.

32. The archiver of claim 31 wherein the user interface comprises a component that allows the user to identify a characteristic of the electronic mail message to be archived.

33. The archiver of claim 32 wherein the user interface further comprises a search component that selects the message from a group of messages based upon the characteristic identified by the user.

34. The archiver of claim 31 wherein the user interface comprises a component that allows the user to provide an instruction to archive all electronic mail messages transmitted to the user.

35. The archiver of claim 31 wherein the user interface further comprises a component that allows the user to provide information governing the manner of archiving the electronic mail message.

36. The archiver of claim 35 wherein the information identifies a component of the message to be excluded when the message is archived.

37. The archiver of claim 35 wherein the information indicates whether the message is to be deleted from the electronic mail system when the message is archived.

38. The archiver of claim 35 wherein the information identifies a location to store the message.

39. The archiver of claim 35 wherein the information provided by the user is stored for use in archiving subsequent messages.

40. The archiver of claim 31 wherein the data processing application comprises a database application.

41. The archiver of claim 40 wherein the data processing application comprises Lotus Notes.

42. A computer network in which an electronic mail message may be shared with a party not named as a recipient of the message, comprising:

a user interface that allows a user to identify the electronic mail message to be shared, a formatting component that converts the message from an electronic mail format to a format defined by a data processing application, and a data processing system that obtains the converted message and makes the converted message available to the party not named.

43. The computer network of claim 42 wherein the data processing application comprises a shared database program.

44. The computer network of claim 42 wherein the data processing application comprises Lotus Notes.

45. A computer system that enables archiving of a message from an electronic mail system, comprising:

a central processor, a data storage device, and an archiving program comprising:

a user interface that allows a user to select the message to be archived, and a component that allows the central processor to receive the message from the electronic mail system in an original electronic mail format, convert the message into a format defined by a data processing application capable of running on the computer system, and store the converted message in the data storage device.

46. An electronic mail archiving program fixed on a storage medium, comprising:

a component that allows a computer system to receive an electronic mail message from an electronic mail system in an original electronic mail format, a conversion component that causes the computer system to convert the message into a format defined by a data processing application, and a storage component that causes the computer to store the converted message in a storage device in the computer system.

47. The archiving program of claim 46 wherein the storage medium containing the archiving program resides in a computer system other than the computer system in which the converted message is stored.

48. The program of claim 46 further comprising a component that allows the user to identify a characteristic of the electronic mail message to be archived.

49. The program of claim 48 further comprising a search component that selects the message from a group of messages based upon the characteristic identified by the user.

50. The program of claim 46 further comprising a component that allows the user to provide an instruction to archive all electronic mail messages transmitted to the user.

51. The program of claim 46 further comprising a component that allows the user to provide information governing the manner of archiving the electronic mail message.

52. The program of claim 51 wherein the information provided by the user is stored for use in archiving subsequent messages.

53. The archiver of claim 51 wherein the information identifies a component of the message to be excluded when the message is archived.

54. The archiver of claim 51 wherein the information indicates whether the message is to be deleted from the electronic mail system when the message is archived.

55. The archiver of claim 51 wherein the instruction identifies a location to store the message.

56. The program of claim 46 wherein the data processing application comprises a database application.

57. The program of claim 46 wherein the data processing application comprises Lotus Notes.

\* \* \* \* \*

UNITED STATES PATENT AND TRADEMARK OFFICE
CERTIFICATE OF CORRECTION

PATENT NO. : 5,890,163

DATED : March 30, 1999

INVENTOR(S) : William Gregory Todd

It is certified that error appears in the above-identified patent and that said Letters Patent is hereby corrected as shown below:

On the title page, after item [76], insert the following:

Item [73}  Add --Compaq Computer Corporation, Houston, Tx.--.

Signed and Sealed this

Seventh Day of November, 2000

Attest:

Q. TODD DICKINSON

*Attesting Officer*     *Director of Patents and Trademarks*